United States Patent [19]
Iura et al.

[11] 4,426,142
[45] * Jan. 17, 1984

[54] CAMERA EMPLOYING A FLASH ILLUMINATION DEVICE AND A FLASH PHOTOGRAPHING SYSTEM

[75] Inventors: Yukio Iura, Yokosuka; Masayoshi Yamamichi, Kanagawa; Takashi Uchiyama, Kanagawa; Tetsuya Taguchi, Kanagawa; Yukio Mashimo, Tokyo, all of Japan

[73] Assignee: Canon Kabushiki Kaisha, Tokyo, Japan

[ * ] Notice: The portion of the term of this patent subsequent to Mar. 16, 1999 has been disclaimed.

[21] Appl. No.: 316,516

[22] Filed: Oct. 29, 1981

Related U.S. Application Data

[63] Continuation of Ser. No. 50,325, Jun. 20, 1981, Pat. No. 4,319,814, which is a continuation of Ser. No. 731,225, Oct. 12, 1976, abandoned, which is a continuation of Ser. No. 563,446, Mar. 31, 1975, abandoned.

[30] Foreign Application Priority Data

Apr. 1, 1974 [JP] Japan ................................. 49-36793
Apr. 1, 1974 [JP] Japan ................................. 49-36794

[51] Int. Cl.³ .................... G03B 7/085; G03B 15/05
[52] U.S. Cl. .................................. 354/412; 354/289; 354/413; 354/445; 354/145.1
[58] Field of Search ........................ 354/27, 32, 33, 34, 354/40, 43, 139, 145, 149

[56] References Cited

U.S. PATENT DOCUMENTS

| 3,318,215 | 5/1967 | Schiks | 354/139 |
| 3,464,332 | 9/1969 | Davison et al. | 354/27 |
| 3,688,664 | 9/1972 | Mashimo | 354/33 |
| 3,710,701 | 1/1973 | Takishima et al. | 354/149 X |
| 3,738,240 | 6/1973 | Mitani et al. | 354/40 X |
| 3,836,920 | 9/1974 | Uchiyama et al. | 354/149 X |
| 3,843,248 | 10/1974 | Iyama et al. | 354/149 X |
| 4,005,444 | 1/1977 | Uchiyama et al. | 354/139 X |
| 4,030,108 | 6/1977 | Yazaki et al. | 354/149 X |
| 4,319,814 | 3/1982 | Iura et al. | 354/33 |

FOREIGN PATENT DOCUMENTS

| 1472727 | 10/1969 | Fed. Rep. of Germany | 354/149 |
| 1922904 | 11/1969 | Fed. Rep. of Germany | 354/149 |
| 1772617 | 10/1970 | Fed. Rep. of Germany . | |
| 2311142 | 9/1972 | Fed. Rep. of Germany . | |
| 2119994 | 10/1972 | Fed. Rep. of Germany . | |
| 48-36837 | 5/1973 | Japan . | |
| 51-17477 | 4/1974 | Japan . | |

Primary Examiner—Michael L. Gellner

[57] ABSTRACT

A flash illumination device is removably mounted on the body of an accompanying camera. Electric adjusting means set the diaphragm of the camera. A signal system produces a signal corresponding to a prescribed diaphragm setting and transfers the signal through a shoe attached to the camera body or through other electric connecting means. When the flash illumination device is connected to the camera body, the signal system provides an electrical signal which causes the adjusting means automatically to set the diaphragm.

37 Claims, 22 Drawing Figures

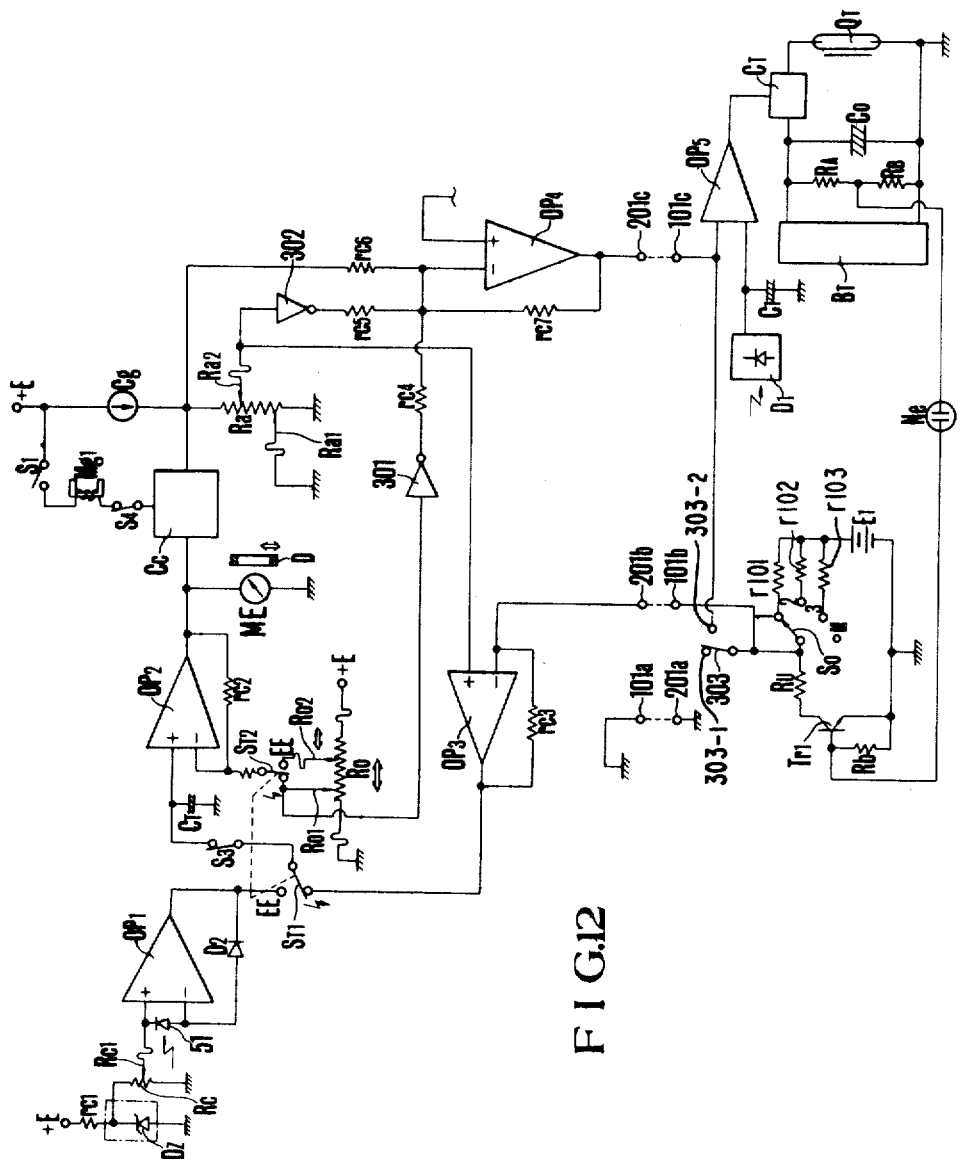
F I G. 12

CAMERA EMPLOYING A FLASH ILLUMINATION DEVICE AND A FLASH PHOTOGRAPHING SYSTEM

This is a continuation of application Ser. No. 050,325 filed June 20, 1981, U.S. Pat. No. 4,319,814, which is a continuation of application Ser. No. 731,225, filed Oct. 12, 1976, abandoned, which in turn is a continuation of application Ser. No. 563,446 filed Mar. 31, 1975, abandoned.

DETAILED EXPLANATION OF THE INVENTION

The present invention relates to a camera employing a flash illumination device and a flash photographing device system, especially to a flash photographing system which can preferentially select the diaphragm aperture value of a camera.

DESCRIPTION OF THE PRIOR ART

Several types of electrically-controlled camera-mounted (or camera-housed) photo flash systems or flash devices are known. In one type of system illuminating light from a stroboscopic device is directed toward an object and the reflected light is received either at the stroboscopic device or at the camera where it is measured. When the measured reflected light reaches a specific integrated value, the system automatically stops the illumination.

In a second system, a time constant circuit which ultimately stops the illumination is set in advance on the basis of the distance to a subject to be photographed. The time constant circuit responds by ending illumination by the stroboscopic device in dependence upon the set distance.

In a third type of a system, the object is illuminated prior to operation of the stroboscopic device. Distance information to the object is obtained on the basis of the amount of light reflected as a result of the prior illumination. Stroboscopic illuminating energy is adjusted in accordance with this information.

Such a photo flash system presents problems. For example a diaphragm aperture determined by a stroboscope's exposure calculating device must be read and manually set into the camera. This involves troublesome handling. Also, the diaphragm may be set erroneously when films of different sensitivities are used. Even when films with the same sensitivity are used, the possibility of diaphragm setting errors exist.

Moreover, depth of field adjustments may further increase the possibility of errors.

The problems presented by the prior art, and the invention, will be best understood from the following detailed description when read in light of the following drawings. In the drawings:

FIG. 12 is an electric circuit diagram of a concrete example of a block diagram shown in FIG. 11.

Figure 11:
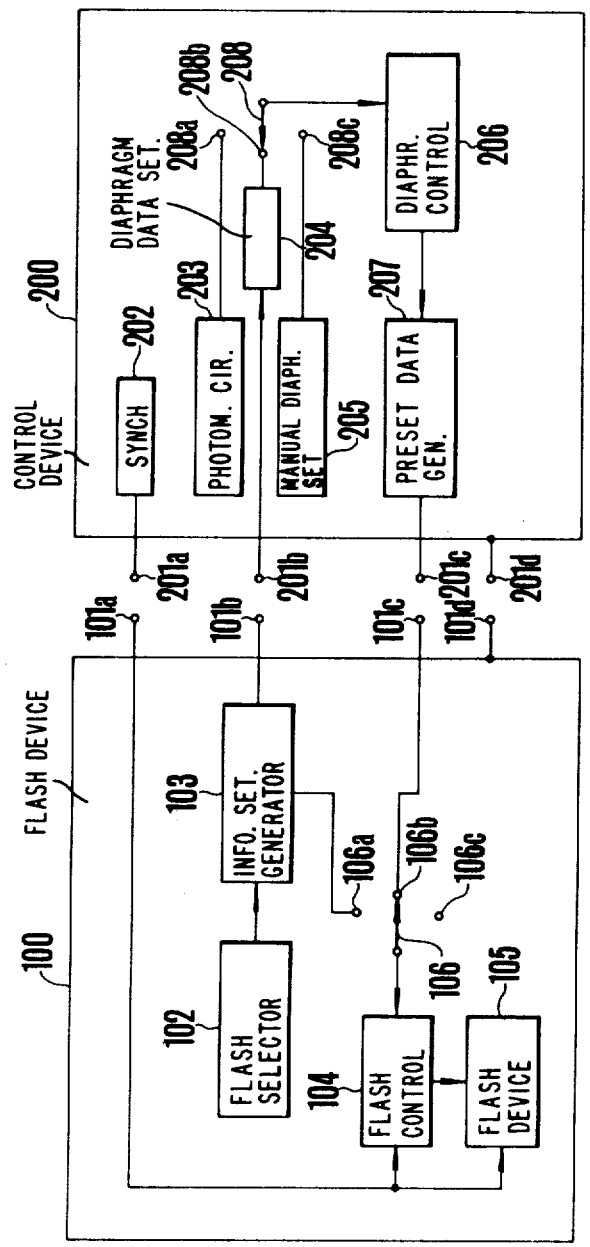
FIG. 11 is a block diagram of a flash system according to the present invention.
Figure 13:
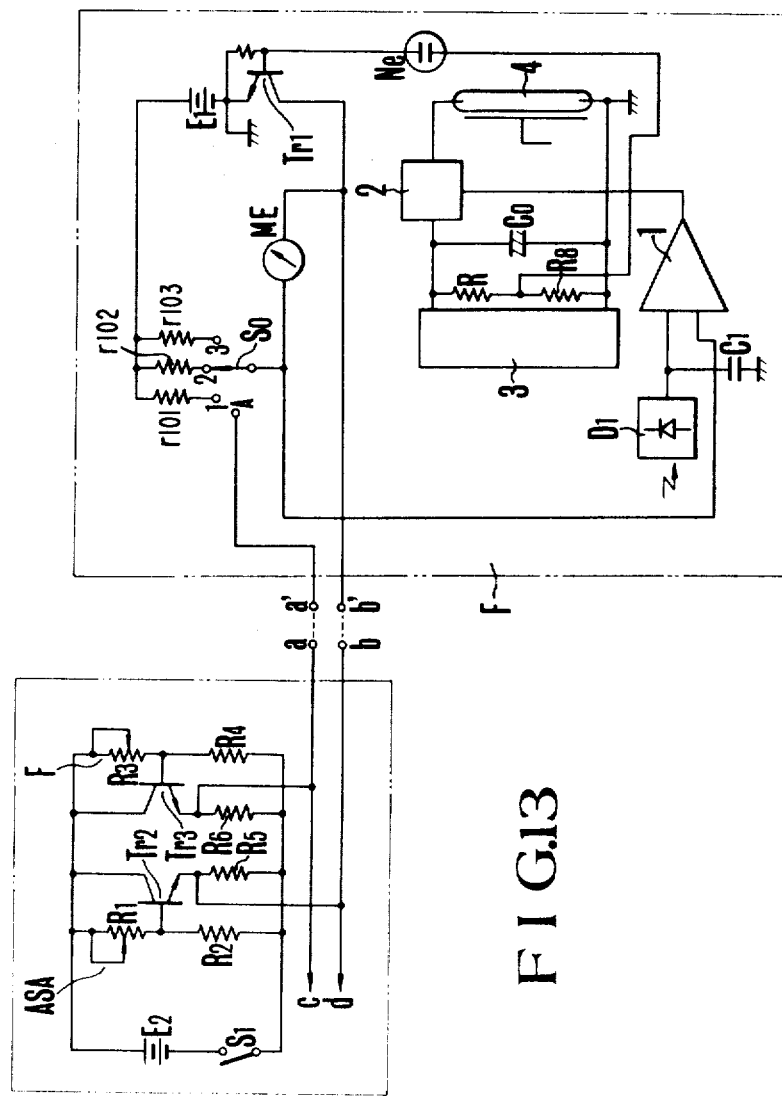
Figures 14A, 14B:
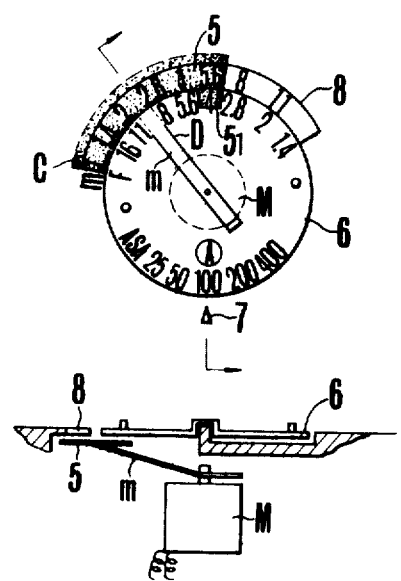
Figure 15:
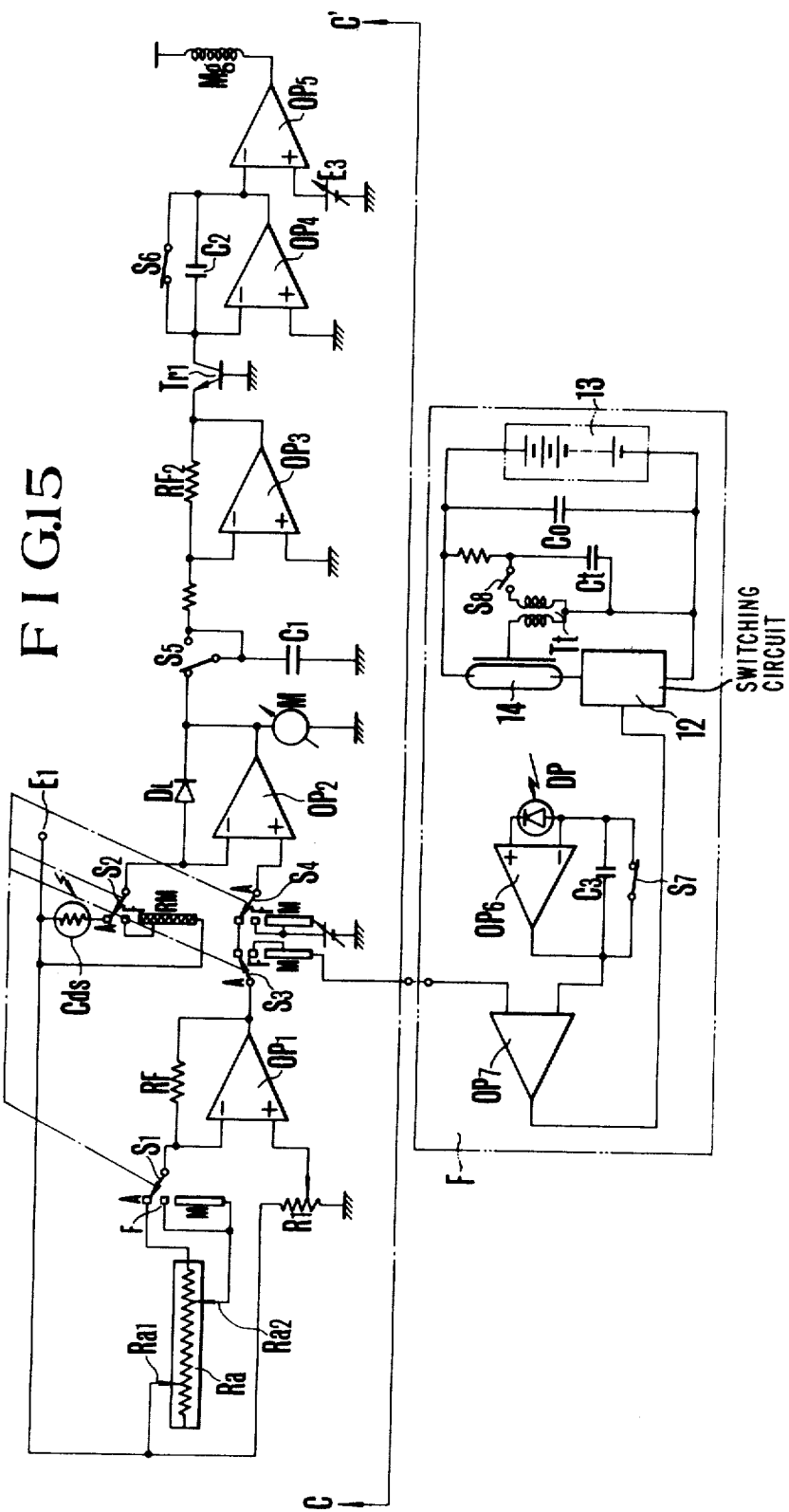
Figure 16A:
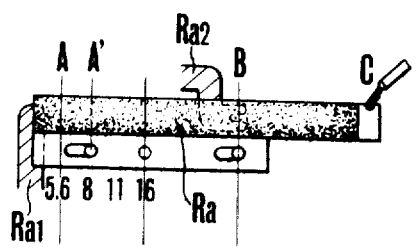
Figure 16B:
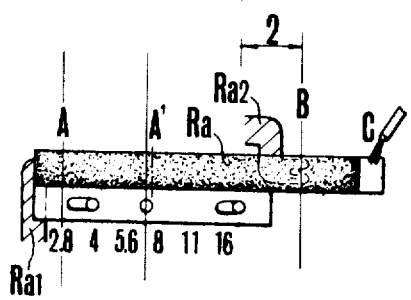
Figure 16C:
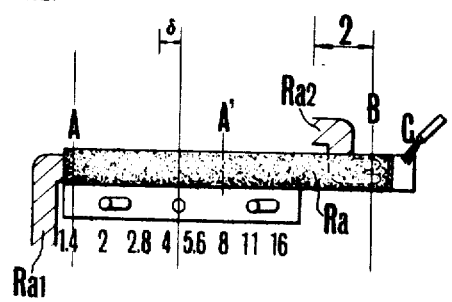
Figure 17:
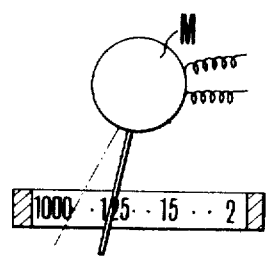

FIG. 13 to FIG. 17 show modified examples of set-up of important parts which can be applied to a system shown in the block diagram of FIG. 11, wherein FIG. 13 shows manually set control circuit parts at camera side and at a flash device side, FIGS. 14A and 14B are set drawings of an indication meter of a flash device shown in FIG. 13, FIG. 15 is an electric circuit diagram of another example of a computer-type photo flash system according to the present invention to be used along with an electronics shutter circuit of a single lens reflex camera, FIGS. 16a, 16b, and 16c are theoretical diagrams of diaphragm aperture setting resistance applied to a shutter circuit shown in FIG. 15, and FIG. 17 shows an example of a set-up of an indication meter applied to a shutter circuit shown in FIG. 15.

Figure 1:
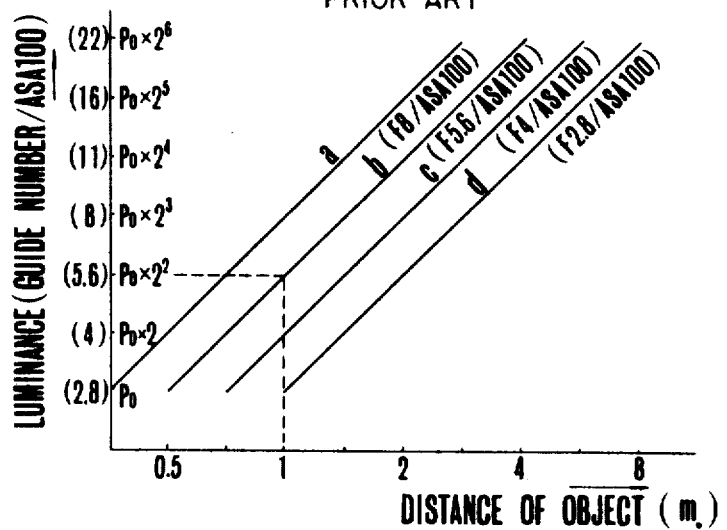
FIG. 1 is a drawing illustrating operating characteristics of a prior art system.

In the conventional computer-type photo flash system of FIG. 1, an appropriate amount of light for an exposure is obtained for any particular distance to an object by selecting a diaphragm aperture value. In FIG. 1, the abscissa represents the distance to an object while the ordnance indicates flash luminance. The curves a, b, c, and d illustrate how the luminance varies with the distance to an object for various flash devices or flash setting positions. Thus a flash device of type b requires that the diaphragm be set at 5.6 when ASA 100 film is used, and its luminance is varied according to the distance to an object.

As noted, such conventional computer-type photo flash systems are complicated and often result in errors that produce improper exposures.

Furthermore, when ASA 50 film is used in the type b flash device, the luminance reaching the film needs to be doubled for the same distance. Thus it must be used with an F4 stop instead of F5.6. Thus the diaphragm aperture must be changed according to the sensitivity of the film used. This complicates matters even further. Using flash devices with varying luminances does not really uncomplicate the problems.

The invention, as described with respect to the following embodiments overcomes many of these difficulties.

Figure 2:
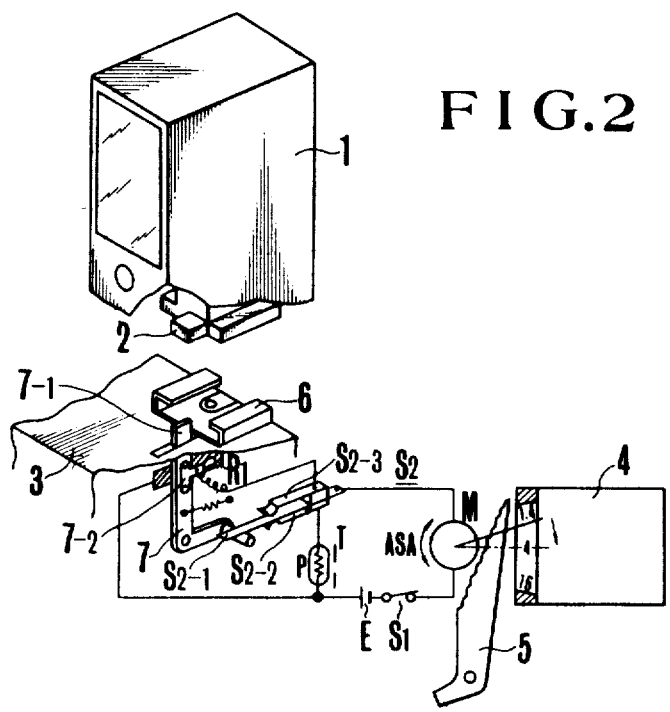
FIG. 2 shows an example of a camera to be used with a computer-type photo flash system having a signal member for designated diaphragm aperture information.

In FIG. 2, a computed-type of electrically-controlled photo flash system receives light reflected from an object whose illumination is to be automatically controlled. The photo flash system possesses a mounting having a protrusion (or protruding part) 2, whose length depends upon a designated diaphragm aperture.

FIG. 2 shows parts, such as a camera body 3 and a viewfinder 4 as well as an exposure meter M, of an accompanying camera. In the camera, a saw-tooth member 5 of a conventional EE mechanism automatically sets the camera's diaphragm aperture on the basis of the position of the pointer of the exposure meter M. A mounting shoe 6 for the stroboscopic device is provided at the upper part of the camera body. A protrusion 7-1 at the end of a detection lever 7 projects through the camera body to the edge of the shoe 6. A movable contact (or contact piece) S2-1 of a selector (or changeover) switch S2 engages a pin on the forward end of the detection lever 7. A variable resistance R1 is formed by a slide contact (or sliding piece) 7-2 mounted on the lever 7 and a resistance member which is shaded in FIG. 2. A light receiving element P receives light from an object through an optical system (not shown) after passing through a light receiving lens or the objective lens of the camera. A diaphragm T is varied in dependence upon the shutter speed setting. A power switch S-1 connects the system to a power source E.

In the circuit of the camera 3, as shown in the drawing when the power source switch S1 is turned ON, and contacts S2-1 and S2-2 of the change over switch S2 are in contact the light receiving element P, which depends upon shutter time information, and the power source E and the meter M with its case rotatably set or the bases of ASA information, are connected in series. The diaphragm aperture value needed for an appropriate exposure at that time is indicated within finder 4 by the meter pointer. The saw-tooth part 5, etc. is provided at the camera 3 to automatically control diaphragm aperture by a so-called EE mechanism. Of course the diaphragm aperture value of a camera may be manually set by reading out the diaphragm aperture value indicated within a finder without using the saw-tooth part 5, etc.

When the above mentioned flash device 1 is mounted to the shoe 6 of a camera, the 7-1 of the lever 7 is shifted by being pressed by the mentioned protruding member. This transfers contact S2-1 of the switch S2 to S2-2 contact. Also variable resistance R1, whose value is determined by a sliding brush 7-2 attached to the lever 7, is connected in place of the light receiving element P. Therefore, if the designated diaphragm aperture of the mounted flash device 1 is F4 for ASA 100 film the value of R1 corresponds to the same and current corresponding to the same flows to the meter M, thus the pointer automatically points to F4. If the sensitivity of the film used is ASA 200, the pointer will automatically points to F5.6 as when the case of the meter M is rotatingly set for natural light photographing.

Also, if the mounted flash device requires F5.6 for ASA film, the length of the protruding part 2 is longer than the one mentioned above and the variable resistance R1 is set at smaller value, thus the pointer automatically points to F5.6. Therefore, photographs will be taken with a diaphragm aperture value of F5.6.

In above set-up, when the flash device is mounted the circuit will automatically switch from natural light photographs to flash light photography and the appropriate diaphragm aperture value to be set is indicated within a finder according to the specification of the flash device mounted sensitivity of film used. The diaphragm aperture of a photographing lens is automatically set to this diaphragm aperture value by a so-called EE mechanism. Thus the appropriate diaphragm aperture value is automatically set by mounting of the flash device. Also even when a film with different sensitivity is used the designated diaphragm aperture value of the flash device is automatically adjusted by setting the film sensitivity indication of the camera.

Here, flash devices 8, 9 and 10 have different characteristics. In the flash device 8 the luminance can be changed manually to a desired value. As selector switch S3 is setable to one of three automatic positions A1, A2, or A3 and a manual position M. In the automatic positions, the switch connects one of three resistances into the circuit. A diaphragm plate moves with movement of the switch S3 so as to expose a light receiving element S to light reflected from an object through one of several openings. When the switch S3 moves to the position M, it moves the plate 11 so that the latter completely shields the switch S3. When the switch S3 is set at positions A1, A2 or A3 the openings in the plate 11 are large, medium or small, respectively. The flash device utilizes a known trigger circuit Ti and lead out terminals e1, f1, and g1.

When the flash device 8 is mounted to an accessory shoe 6 of a camera, it is connected to terminals e2, f2, g2 provided at the accessory shoe 6 of a camera. Terminal g2 is connected to X contact which is to be closed in synchronism with the shutter of a camera. The flash device starts flashing in response to the trigger circuit T1, etc. through the terminal g1 at the flash device, and flashing is stopped at a prescribed moment by the light receiving element S, etc. according to the distance to an object and the set position of a change over switch S3. One of the resistances at positions A1, A2, A3, corresponding to said variable resistance R1 of FIG. 2, is connected to the input terminals e2 and f2. Thus the pointer of the meter ME points a prescribed diaphragm aperture value similarly as in the previous example as the switch S2 is set to OFF either automatically or manually. Also if a so-called EE mechanism is provided at a camera the camera is automatically set to the prescribed diaphragm aperture according to the indication of the meter M before exposure of film is started.

When the flash device is set at the manual position M, the metered ME will not respond. Thus errors are avoided. The setting positions A1, A2, and A3 of FIG. 3 correspond for example to the curves c, b, and a, respectively of FIG. 1.

The flash devices 9 and 10 are variable only between automatic and manual so the resistance r2 or r1 establishing their characteristics connected are to coact with the camera side. In these examples, when a flash device is not mounted on a camera, power can be cut off by switching the switch S2, therefore the switch S1 may be closed only when a wind up lever is operated.

Figure 3:
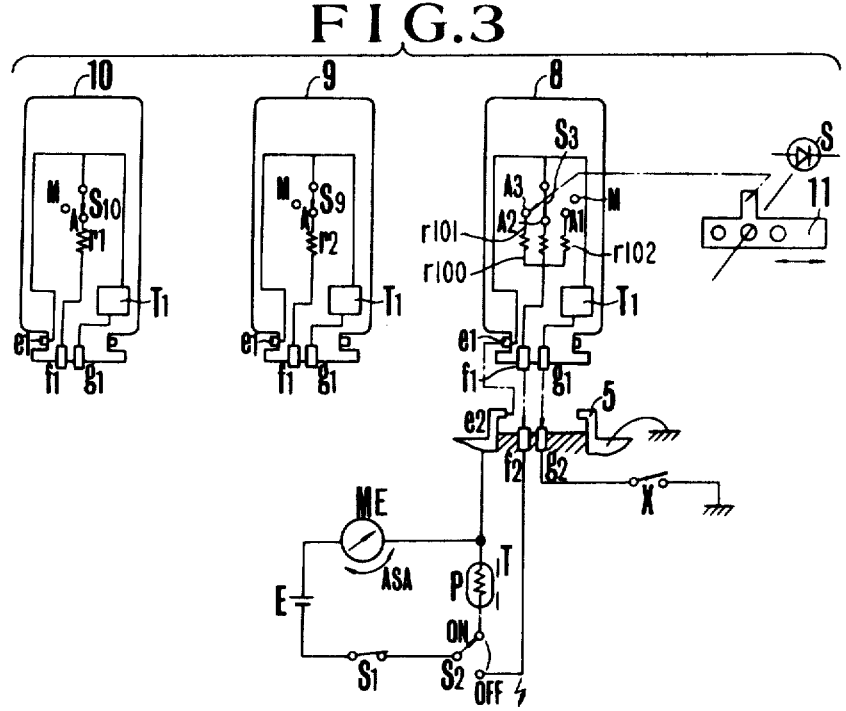
FIG. 3 is a set up diagram of a modified example of a flash device shown in FIG. 2.
Figure 4:
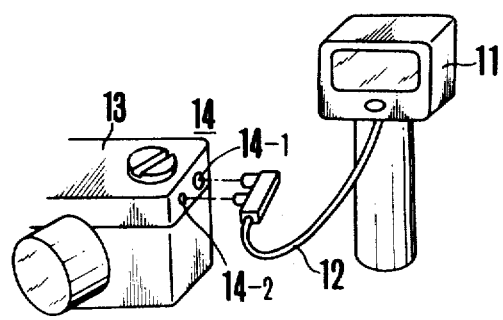
FIG. 4 is a set up diagram of another example of a flash device shown in FIG. 2.

FIG. 4 shows a modified example of flash devices shown in FIG. 3, wherein a resistance corresponding to designated diaphragm aperture value is connected with a diaphragm aperture setting circuit at camera side through synchronizing contact cable. While a flash device 11 is to correspond to 8 in FIG. 3, cable 12 is integrally or removably attached in place of terminals e1, f1, g1, while a terminal 14 is provided at a camera 13 which corresponds to the camera 3 mentioned above in place of the terminals e2, f2, g2, and similar circuit as above is made by connecting cable 12 to said terminal. Thus, a set-up is employed in which the connection is made by cable without providing a terminal at an accessory shoe. If the terminal 14 at the camera is made of synchro-socket 14-1 corresponding to the above mentioned e2 and g2 and 14-2 corresponding to the above mentioned f2, 14-1 only need be used when an ordinary flash device is used.

A flash device having diaphragm aperture information output means as described in FIG. 1 and FIG. 3 may be applied to a shutter which also works as a diaphragm.

Figure 6:
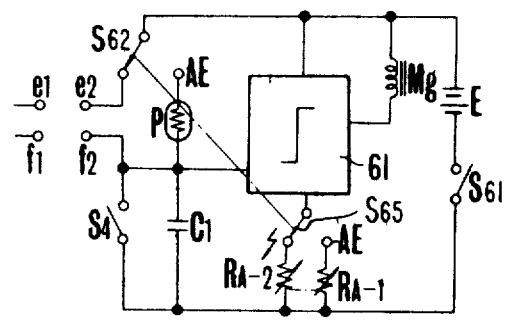
FIG. 6 is a shutter circuit which is used along with a flash device shown in FIG. 3.

FIG. 6 illustrates an example of a shutter control circuit used in a camera in which the shutter also operates as a diaphragm. Here, selector switches S62 and S65 are movable between flash and daylight operating positions. An initiating switch S64 is opened to start shutter operation. Shoe contact e2, and f2 correspond to like members in FIG. 3. The light sensing element P corresponds to the same element in FIG. 3 and may be made of CdS. A capacitor C2 cooperates with the resistance of the element P to operate a Schmidt trigger circuit 61 which operates an electromagnet Mg that serves to close the shutter. The entire system is operated by a power source E through a source switch S61.

When the ganged selector switches are placed at position AE for daylight operation, the circuit responds to the film sensitivity setting resistance RA-1. The source E then energizes the element P. When the shutter is opened, the switch S4 opens and allows the source E to charge the capacitor C through the element P until the Schmidt circuit 61 operates the magnet Mg and starts closing the shutter. The magnet also closes a synchronizing contact in synchronism therewith.

Figure 5:
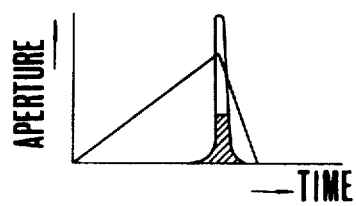
FIG. 5 is a functional schematic diagram of a shutter circuit shown in FIG. 6.

When the switches S2 and S5 are set for flash operation, resistance is such as resistance R1 or the resistances in series with the positions A1, A2 and A3 in FIG. 3 are connected between the terminals e2 and f2 in lieu of the light sensing element P. The shutter and the synchronizing contact are then closed in response to the resistance across terminals e2 and f2 as well as a resistance RA-2 which is variably set to the film sensitivity of the film for flash. Thus flash operation is accomplished by this computer-type photo flash system at a desired diaphragm aperture value. The operation is disclosed in the graph of FIG. 5.

The reason for providing different variable resistances for film sensitivity setting for natural light photographing and flash photographing is that the exposure of film is determined by both of shutter time and aperture in natural light. For flash the exposure depends mainly on the aperture.

Figure 7:
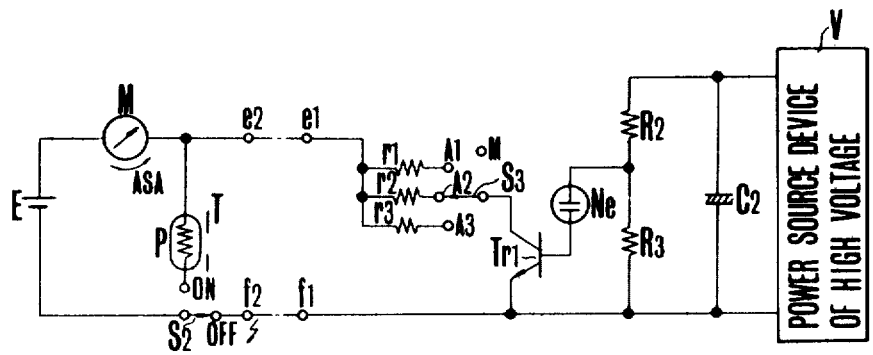
FIG. 7 is an electric circuit diagram of a flash device and an exposure determining mechanism at a camera side according to the present invention.

FIG. 7 shows further another example of a flash device according to the present invention. Here a safety warning device for incomplete charging is added to a flash device shown in the above example. In this drawing an initiation main switch S1 for initiating a high voltage power source device V is omitted and a transistor Tr1 is connected in series as a switching element between terminals e1 and f1, while other set-up is same as the example shown in FIG. 3, thus explanation thereof will be omitted. A neon tube Ne is connected through bleeder resistances R2 and R3 of a main capacitor C2 to be charged by a high voltage power source device V of the flash device is connected to the base of the transistor Tr1. Therefore, only when the main capacitor C2 is sufficiently charged the neon tube Ne is lighted and the transistor Tr1 turns ON and current flows to the circuit in the camera set for flash. This the meter ME points to the desired diaphragm aperture. Thus a photographer can determine completion of charging through the viewer. Also if the release of a shutter is blocked as shutter button is pressed when an ammeter is not swung, further convenience is acieved.

Figure 8:
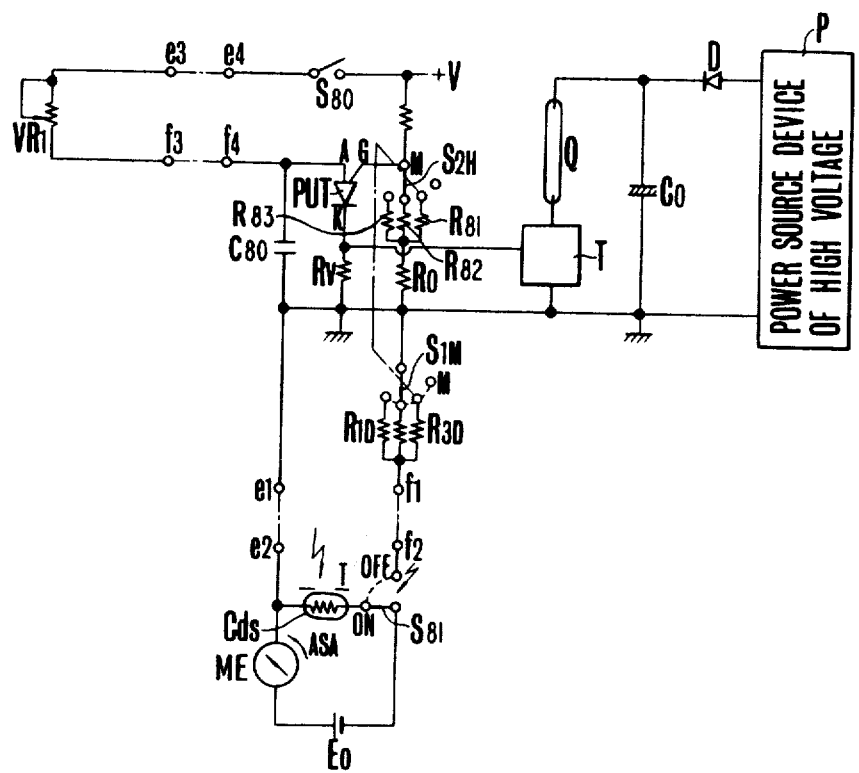
FIG. 8 is an electric circuit diagram to show a modified example of a flash device and an electric circuit of an exposure determining mechanism at a camera side according to the present invention.

FIG. 8 illustrates an embodiment of the present invention in which the distance information is applied by a variable resistance responsive to the focusing ring of the objective lens, and the luminance is controlled by this information.

Here, as in the other figures, like reference characterters refer to like parts as the other Figures. A variable resistance VR1 is linked with a camera focusing ring through an adapter which can be attached to and removed from a lens barrel part and is connected to the circuit through the connecting terminals ef, f4. A switch S80 is linked with a shutter release. Member PUT is a switching element. Member C80 is a timer capacitor. R81 to R83 are timer resistances. Resistances R1D to R3D can be varied with the aperture value, along with the R81 to R82. Switch S81 is a selector switch. ME is an exposure meter corresponding to the meter ME in FIG. 3. Member Cds is a light receiving element to receive light from an object. Member T is a trigger circuit for a Xenon tube Q. Member Co is an illuminant capacitor. Member P is a high voltage power source. Members e1, e2, f2 are connecting terminals at the shoe. The ganged switches S1M, S2M are set by a handling member to select a resistor R81 to R83; at the stroboscope. As an object distance is set, VR1 is also. When the shutter is released, first So turn ON and charging is done at the capacitor C through TV→VR1→C→grounding, and after an elapse of a prescribed period of time PUT turn ON. The period of time for PUT coming on is that the potential of the capacitor C reaches such voltage as equal to or higher than the one by a gate resistance R1(VR3) of PUT which is set in correspondence with the designated diaphragm aperture value being set. As PUT turns ON the trigger circuit T has current flowing thereto and Q starts illumination. Therefore the luminance is controlled by the object distance and the set designated diaphragm aperture value.

Figure 9A:
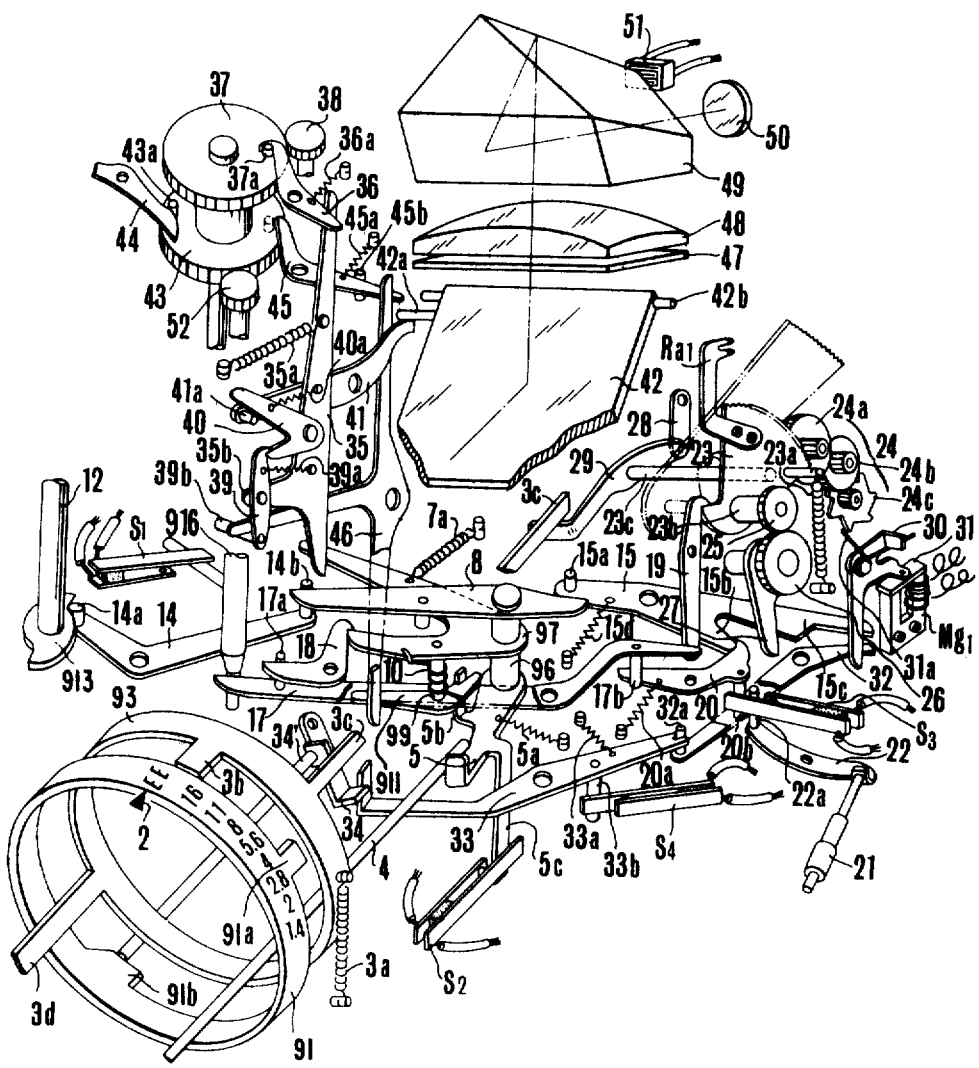
FIG. 9A is a set-up drawing of a single lens reflux camera which is to be used with a flash device according to the present invention.
Figure 9B:
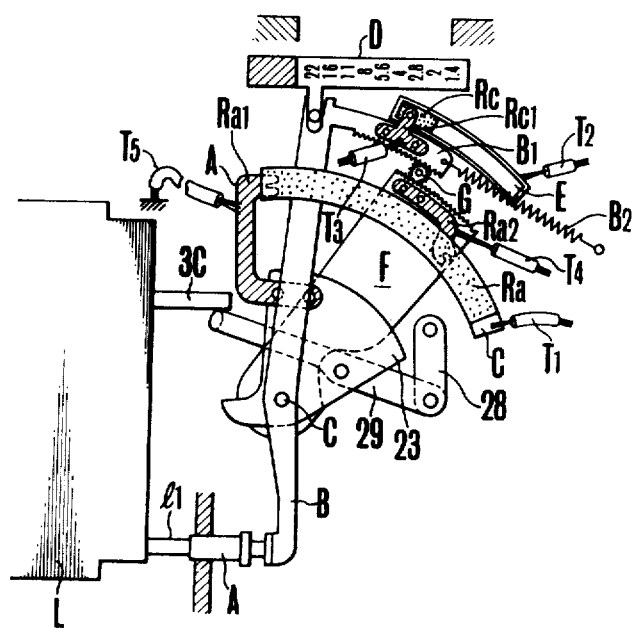
FIG. 9B is a set-up drawing of important parts of a camera shown in FIG. 9A.
Figure 10:
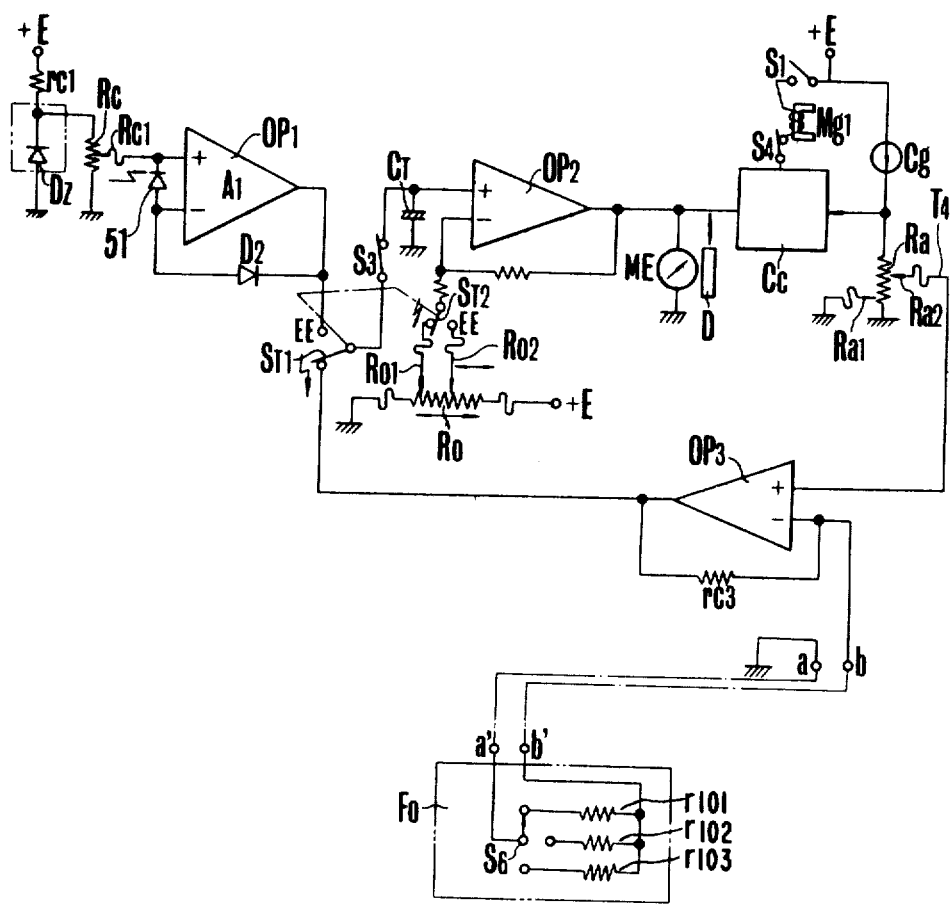
FIG. 10 shows a control circuit of a camera shown in FIG. 9A.

FIG. 9A to FIG. 10 show other modified examples of a camera and a flash device according to the present invention, particularly when the present invention is applied to a single lens reflex camera. FIG. 9A to FIG. 9B show mechanism set-up of a single lens reflex camera which can mount exchange lenses with preset diaphragm device and can measure light with fully opened aperture. The drawings show concrete examples of such single lens reflex camera that so-called stepwise control exchange lenses, in which the maximum aperture value preset position of a linking member for a preset diaphragm to camera side is constant even if the maximum aperture is different, are used as exchange lenses. After the shutter time is preferentially set, a so-called TTL fully opened light measuring of the amount of light from an object is accomplished in the maximum aperture state of the exchange lenses. The preset diaphragm aperture value is electromagnetically set to provide appropriate exposure to the lens in correspondence with the value of the measurement.

In FIG. 9 the camera is shown with the film wound up and shutter charging completed. A diaphragm ring 91 is rotatably mounted on an interchangeable lens. An automatic diaphragm mark EE and a manual diaphragm mark appear on the diaphragm ring 91 which includes a protrusion 91a and a cam 91b. An index 2 permits setting of the diaphragm mark EE and the manual diaphragm marks. A diaphragm reset ring 93 is driven by a driving mechanism within the camera, to be described hereinbelow. A spring 3a biases the diaphragm reset ring clockwise. A protrusion 3b from the ring 93 can engage a protrusion of the ring 91.

Also an arm 3c is provided at a diaphragm preset ring 93, further the diaphragm preset ring 93 determines rotation of a bell crank through a diaphragm setting cam ring not shown in the drawing by a lever 3d mounted thereon, and the bell crank regulates the rotation of a diaphragm driving ring not shown in the drawing for determining the aperture of diaphragm.

Member 94 is a pin mounted on the diaphragm driving ring and its end engages an automatic diaphragm lever 5 being rotatably biassed to counter clockwise direction by a spring 5a. This automatic diaphragm lever 95 has a riser part 5b and a hungdown part 5c and a movable contacting piece of a hold switch S2 engages with said hungdown part 5C. Also a fork shape automatic diaphragm charge lever 97 and an intermediate lever 98 is axially attached to said automatic diaphragm lever 5 in co-axial manner 6. And the automatic charge lever 7 is rotatably biassed clockwise by a spring 7a and a pin 99 is fixed at a central part of one side of said lever 7 and said pin 99 is axially attached to a common lever 911 through a spring 10. One end of said common lever 911 engages with the riser 5b of the above mentioned automatic diaphragm lever 95. Member 912 is a wind up axle of a wind up lever not being shown in the drawing and a wind up cam 913 is fixed at said wind up axle 12. Member 914 is an intermediate lever which is rotatable, and a pin 14a provided at one end part of said intermediate lever 14 engages with a wind up cam 13. Also a pin 14b is provided at the other end part of the intermediate lever 14 and this pin 14b engages with one end of said intermediate lever 8. A pin 15a provided at one end of a charge lever 915 which is rotatable is engageable with the other end of said intermediate lever 98. The other end of said charge lever 915 is split into two and is rotatably biassed to counterclockwise direction by a spring 15d. Member 916 is a shutter button and 17 is a rotatable release lever. An iron piece 17c being attracted to a release magnet Mgo is rotatably attached to one end of said release lever 17. A pin 17a is planted on said release lever 17 and one end of an automatic diaphragm engaging lever 18, which engages one side of the above mentioned automatic charge lever 7, is checked by said pin 17a. And one end of a rotatable EE check lever 19 engages the other end of the release lever 17. Also a pin 17b is mounted on the other end of the release lever 17 and one end of a lever 20 which is rotatable to counterclockwise direction by a spring 20a is checked by said pin 17b. A movable contacting piece of a memory retension switch S3 is checked by a pin 20b provided at the other end of said lever 20. A movable contacting piece of said switch S3 is also checked by a pin 22a planted on a lever 22 which is activated by an EE lock button 21. And the other end of the lever 20 engages with one end 15b of the split part of the above mentioned charge lever 915. member 23 is an EE sector gear rotatably biassed to clockwise direction by a spring 23a and this sector gear 23 is checked by the other end of the above mentioned check lever 19. Gears 24a, 24b and stop wheel 24c which form a speed regulating mechanism 24 engage with said sector gear 23.

Also, a sliding piece Ra1 of a variable resistance Ra for determining preset diaphragm aperture value is attached as shown in FIG. 9B to the sector gear 23. A gear 25 is attached to an axle 23b of said sector gear 23 and EE charge gear 23 engages with said gear 25. A lever 27 is fixed coaxially at said gear 26 and this lever 27 contacts a stepped part of the other end 15c of the split part of the charge lever 915 a pin 23c is planted on said sector gear 23 and end plane of said pin 23c is fixed to a signal lever 29 axially attached to a support lever 28. A bent end of said signal lever 29 checks the arm 3c of the preset ring 3. Membr Mg1 is a diaphragm control magnet and this magnet Mg1 can attract an iron piece 31 attached to an attracting lever 30. The attracting lever 30 is rotatably biassed to counter clockwise direction by a spring 31a, and bend end of said lever 30 can engage with the stop wheel 24c of the speed regulating mechanism 24.

Also one split end of the charge lever 15 and one end of manual clamp lever 32 contact the other and of the attracting lever 30. A pin 32a is provided at the other end of the clamp lever 32, and said pin 32a engages one dent end of a transmission lever 33. This transmission lever 33 is rotatably biassed to a counter clockwise direction by a spring 33a and checks a movable contacting piece of manual switch S4. The other bent end of the transmission lever 33 is checked by a lever 34. A pin 34' is mounted at the lens and an end plane of said pin 34' contacts the cam part 1b of said diaphragm ring 1. Member 35 is a mirror driving lever having a delay device not shown in the drawing, and this mirror driving lever 35 is rotatably biassed counter clockwise by a spring 35a and one end thereof is checked by the other end of the automatic diaphragm charge lever 7, while the other end thereof engages one end of a front screen fixing lever 36.

This front screen fixing lever 36 is rotatably biassed counter clockwise by a spring 36a and its forward end engages a pin 37a planted on a front screen gear 37. The front screen gear 37 engages a front screen pinion 38 for a front screen drum not shown in the drawing.

Also a mirror fixing lever 39 is axially attached to a protruding part 35b of the mirror driving lever 35. And said mirror fixing lever 39 is rotatably biassed to clockwise direction by a spring 39a spanned between the mirror driving lever 35 and itself, and one end of the same engages a push up lever 50 being axially attached to the mirror driving lever 35.

This push up lever 40 is rotatably biassed to clockwise direction by a spring 40a spanned between itself and the mirror driving lever 35, and the other end of the same is checked by a pin 41a planted on a mirror push up lever 41. The other end of said mirror push up lever 41 checks a push up pin 42a provided on the mirror 42. This mirror 42 is rotatable around a mirror axle 42b.

A rear gear 43 is provided coaxially with but separately from said front screen gear 37, and said rear screen gear 43 engages with a rear screen pinion 52 for a rear screen drum not in the drawing. Also a pin 43a is planted on the rear screen gear 43. Element 44 is a shutter time setting lever rotated by said pin 43a. And this lever 44 is linked with a mechanism to determine the shutter time mechanically or electronically in correspondence with a known shutter time setting dial and as a set time has elapsed after shutter front screen is released, the engagement with the pin 43a is released. Member 45 is rear screen signal lever rotated by said pin 43a and said lever 45 is rotatingly retained at the position of a check pin 45b always by a spring 45a. Member 46 is three-branched lever and first end of said lever 46 is checked by the other end of said lever 45, and the second end is checked by a pin 39b planted on the mirror fixing lever 39, while the third end is checked by the other end of the common lever 11. And light penetrating through a photographing lens not in the drawing goes through a mirror 42, a focal plane 47, a condensor lens 48 and a pentagonal prism 49, in turn and is recognized by a photographer by an eye-piece 50. Element 51 is a light receiving element of for example, a silicon blue cell. An exchange lens L not shown in FIG. 9A being retained in a freely rotatable manner with a diaphragm ring 1 has a signal member $l_1$, having such length in optical axis direction as corresponding to the maximum aperture of said lens, being planted on each of such lens, and said member $l_1$ engagingly coupled with a receiving member A of a camera when a lens is mounted. B is a signal lever being retained in a freely rotatable manner on a central axle C of the sector gear, and forward end of said lever engages with a diaphragm scale plate D being shifted within a finder, and at the same time its forward end split part $B_1$ carries a sliding piece $Rc_1$ of the resistance Resistor Rc. Rc is correction resistance for vignetting at the time of fully opened aperture light measuring as will be explained later, and its end is electrically connected with an electrode plate E. The lengthwise length of the resistance Rc is set to such length that the sliding piece $Rc_1$ slides on the resistance plane Rc through a signal lever B only by the signal member $l_1$ planted at rear end plane of a large aperture value lens (a lens brighter than F4) requiring vignetting correction (hereinafter called as C correction). Member F is a sliding lever provided on the rotation center axle C in a freely swingable manner, and its swing cross section has a gear part formed thereon and a sliding piece $Ra_2$ is fixed at a swing end of the sliding lever F through an insulating board not shown in the drawing. A gear G is coupled rotatably on a fixed axle planted on a fixed frame of a camera, and said gear G engages the gear parts of the sliding lever F and of the signal lever B. Therefore, when the signal lever B swings by the signal member at the lens side, the lever F is made to slide on the sliding piece $Rc_1$ and the sliding piece Rc (when lens is brighter than F4) or on the electrode E (other lens than above). On the other hand, the gear G rotates by swing of the signal lever B and the sliding lever F also swings followingly, therefore the sliding piece $Ra_2$ slides on the resistance Ra. As a result, such resistance value as corresponding to C correction amount can be obtained between lead terminals $T_2$-$T_3$, while such resistance value as corresponding to the brightness (corresponding to the maximum aperture) of a mounted lens can be obtained from the terminal $T_4$. Each of sliding pieces $Ra_1$, $Ra_2$, $Rc_1$ is so fixed through insulating board as being electrically insulated from respective carrier members. While flexible lead wires $T_1$ to $T_5$ are connected thereto, as the lead wire $T_5$ is grounded, if the sliding piece $Ra_1$ only is directly fixed on a teeth shape gear 24 without an insulating board intervening, the lead wire $T_5$ may be eliminated. The resistance Ra is fixed at a fixed frame (not shown in the drawing) of a camera.

FIG. 10 illustrates a control circuit for the camera shown in FIG. 9. In the drawing, $OP_1$ is an operational amplifier having a parallel circuit of a light receiving element 51 and a correction resistance Rc connected at the input. A diode $D_2$ with logarithmically compressing characteristics is connected between its input and output, to logarithmically compress its input signal.

A constant voltage diode $D_z$ is connected in series with an adjusting resistance $rc_1$, for supplying constant voltage to the resistance Rc and the light receiving element 51. Ganged selector switches $ST_1$ and $ST_2$ have movable contacts switchable to the mark (EE) or to mark ($\tau$) for daylight or flash operation. An information setting variable resistor Ro has a bias voltage E impressed at its one end, and has a slider $Ro_2$, set to corresponding to the set shutter time, also has a resistance $Ro_1$ moved corresponding to the ASA information. Capacitor CT is a memory capacitor and $OP_2$ is an operational amplification circuit. Meter ME is a diaphragm aperture adjustment indication meter. A comparison circuit CC has the output of the amplification circuit $OP_2$ and the resistance Ra connected to its inputs input, and at the same time has the electro-magnet $Mg_1$ connected to its output. Element is a constant current circuit. An operational amplifier $OP_3$ has the above mentioned lead terminal $T_4$ connected to its input while its other input is connected to an accessory shoe terminal b. Character Fo is a computer-type photo flash system corresponding to one of 8 to 10 in FIG. 3. Terminals a', b' are connected electrically to shoe terminals a, b on the camera. One of resistors r101 to r103 is selected by the switch $S_6$ (corresponding to $S_3$ in FIG. 3) when the desired diaphragm aperture value is set.

In operation of the structure in FIGS. 9 and 10, setting of the shutter speed in film sensitivity by suitable shutter and ASA setting dials, not shown, involves adjustment of the adjusting lever 44, the slider $Ro_2$, and the resistor Ro. When the shutter speed is suitably set for flash, such as 1/60 second, the sliders $Ro_1$ and $Ro_2$ will exhibit voltages corresponding to the shutter speed and ASA information.

When an interchangeable lens is mounted to a camera, the slider $Rc_1$ and the slider $Ra_2$ are adjusted by the signal member B an the signal member $l_1$ at the rear plane of lens. The resistances Rc and Ra are adjusted to a resistance value to be C corrected or to a resistance value corresponding to the brightness of lens mounted, respectively.

In the case of daylight EE operation in which a flash device is not used an appropriate diaphragm aperture corresponding to a preferentially set shutter time for proper exposure is automatically set. First the mark EE on the diaphragm ring 1 is made to match a fixed mark 2. As the EE mark on the ring 1 is matched with the mark 2 as shown in the drawing, as the lever 34 is pushed by the contacting relationship between the cam part 1b and the pin 34, the transmission lever 33 is rotated to clockwise to make the manual switch $S_4$ ON and rotate the clamp lever 32 to counter clockwise direction for releasing the clamping of the attracting lever 30. As the light penetrating through a photographing lens strikes a light receiving element 51, an output corresponding to the brightness from the light receiving element 51 is supplied to the input terminal of the amplification circuit $OP_1$, and its output value is memorized through the switches $ST_1$, $S_3$ at the memory capacitor. As the memory capacitor $C_T$ is connected to the first input of the amplification circuit $OP_2$, the shutter speed setting signal from the shutter speed sliding piece $Ro_2$ and film sensitivity setting signal is impressed to the second input terminal of said operation circuit. When a lens brighter than F4 is used, C correction volume is also impressed by the resistance Rc. Thus the operational amplifier $OP_2$ conducts appex operation for these data to obtain appropriate diaphragm aperture value output as a step number value component from its output. The output of the amplifier $OP_2$ is supplied to the diaphragm aperture value indication meter ME to indicate the diaphragm aperture value by a diaphragm indication plate D which is shifted corresponding to the maximum aperture of the mounted lens as shown in FIG. 9. And as the shutter button 16 is pressed down the switch $S_1$ turns ON. Now the comparison circuit Cc places the magnet $Mg_1$ is an excited state by its output. The release lever 17 is rotated to counter clockwise direction, thereby the lever 20 is rotated to clockwise direction, thus the switch $S_3$ turns OFF and the charged voltage of the capacitor CT is memorized and retained. Also as the engagement with the charge lever 15 is released as the lever 20 is rotated, the charge lever 15 is rotated counter clockwise and retreats from the rotation blocking positions of the attracting lever 30 and the lever 27. Also the rotation of the release lever 17 to counter clockwise rotates the check lever 19 counter clockwise and releases its engagement with the sector gear 23. By this, sector gear 23 is rotated to clockwise direction by the spring 23a and the preset ring 3a. By this, the gears 24a, 24b, 24c forming the speed adjusting mechanism 24 rotate and the stop wheel at the last step is rotated counter clockwise. Also, by the rotation of the sector gear 23 the sliding piece $Ra_1$ of the variable resistance Ra will start sliding. Variation in said resistance value is detected by the comparison circuit Cc, and as it reaches a prescribed level the output of the comparison circuit becomes zero and stops the current supply to the magnet $Mg_1$. Thus, the attracting lever 30 is rotated counter clockwise by the spring 31a and its bent part engages and the stop wheel 24c to stop the rotation of the same. This determines the position of the sector gear 23. Also, as the rotation of the sector gear 23 shifts the signal lever 29 downward. Through the pin 23c, the diaphragm preset ring 93 having its arm 3c check by the signal lever 29 is rotated clockwise by the spring 3a, and is stopped. Therefore, as the rotation of the sector gear 23 is stopped as mentioned above the diaphragm preset ring 93 is rotated to an appropriate diaphragm aperture value. This determines the position of a bell crank (not shown in the drawing).

In other words, the stopped position of the diaphragm preset ring 3 produces a diaphragm aperture value determined by the information from the element 51 measuring light through a lens and set shutter speed, film sensitivity and exposure correction information. On the other hand, almost in parallel with the start of such EE action the automatic diaphragm mechanism is also initiated. That is, as the relese lever 17 is rotated counter clockwise by pressing down of the shutter button axle 16, the automatic diaphragm engagement lever 18 is rotated counter clockwise by the pin 17a. By this, the automatic charge lever 7 is rotated to clockwise direction. Therefore, the common lever 11 is rotated clockwise to rotate the automatic diaphragm lever 5 clockwise. By this, the hold switch $S_2$ becomes ON and the pin 4 planted on the diaphragm driving ring is activated to stop down the diaphragm according to the above mentioned position of the bell crank being preset. Also with rotation of the automatic diaphragm charge lever 7 clockwise the mirror driving lever 35 is rotated counter clockwise by the spring 35a. By this, the mirror push up lever 41 is rotated counter clockwise by the coaxial push up lever 40. And, the mirror 42 is pushed up. Along with the push up action of the mirror 42, a delay device not shown in the drawing is activated, then after an elapse of delay time by this delay device the front screen fixing lever 36 is rotated to clockwise direction by the above mentioned mirror driving lever 35.

The delay time of the delay device is to start the shutter after an elapse of time from the maximum diaphragm aperture to the minimum diaphragm aperture. By this the front screen gear 37 starts rotation to run the front screen through the front screen pinion 38. After an elapse of time corresponding to set shutter speed, locking to the rear screen gear 43 is released, therefore the rear screen gear 43 starts rotation to run the rear screen through the rear screen pinion 52. Also when running of the rear screen is completed, the rear screen signal lever 45 is rotated to clockwise direction by the pin 43a through the rotation of the rear screen gear 43, to rotate the tri-tip fork lever 46 to counter clockwise direction. This rotation of the tri-tip fork lever 46 causes the mirror fixing lever 36 to be pushed down and rotated counter clockwise, thus releasing the engagement with the push up lever 40. The push up lever 40 is now rotated clockwise by the spring 40a, and the mirror push up lever 41 and the mirror 42 return to their original positions by a return spring not shown in the drawing. Also by the rotation of the tri-tip fork lever 46, the common lever 11 is rotated to clockwise direction, retreating from the riser part 46 of the automatic diaphragm lever 5. By this the automatic diaphragm lever 5 is rotated in a counter clockwise direction by the spring 5a, and the pin 4 on the diaphragm driving ring returns to resume its original released state. As wind up action is performed by a wind up axle 12, the film wind up and shutter charge are done. At the same time, the charge lever 15 is charged through the intermediate levers 14 and 8, and the automatic diaphragm mechanism and the mirror mechanism are charged. Then the parts having their engagement released by the above mentioned release action are engaged again to resume the state shown in the drawing. Also because the switch $S_3$ is always placed in OFF state through the lever 22 by pressing the EE lock button 21, subsequent photographs can be taken with the first memory value of the capacitor $C_T$.

MANUAL OPERATION

When a desired diaphragm value of the diaphragm ring is set to the indication mark 2, the transfer lever 33 rotates in the counter clockwise direction to put off the manual switch $S_4$ and rotates the clamp lever 32 in the clockwise direction clamp the attraction lever 30, because the pin 34a is disengaged with the cam portion 1b. Just as in the case of the shutter preference photographing, when the shutter button axis is pushed down, the switch $S_1$ is turned on. The diaphragm control circuit is not brought into operation because the switch $S_4$ is off. When the release lever 17 is rotated in the counter clockwise direction, the lever 20 rotates in the clockwise direction to release the engagement with the charge lever 15, so that the charge lever 15 rotates in the counter clockwise direction and retreat from the rotation prevention position of the lever 27. Also by the counter clockwise rotation of the release lever 17, the stopper lever 19 is rotated in the counter clockwise direction to release the engagement with the sector gear 23 so that the sector gear 23 is rotated in the clockwise direction by the spring 23a to move the signal lever 29 downwards by means of the pin 23c. Thus, the diaphragm preset ring 3 which engages the arm 3c with the signal lever 29 is rotated by the spring 3a to the position of the projection 1a of the diaphragm ring 1 so that the diaphragm preset ring 3 is rotated to the preset diaphragm value and the position of the bell crank is determined. Also the counter clockwise rotation of the release lever 17 starts the automatic diaphragm mechanism. Specifically, the automatic diaphragm engagement lever 18 is rotated in the counter clockwise direction to stop down the diaphragm just as in the case of the shutter preference photographing and to cause the spring up of the mirror 42 and to effect the shutter start. Also after the shutter control, the restoration of the mirror 42 and the automatic diaphragm lever 5 is done in a similar way as in the case of the shutter preference photographing.

(II) FLASH PHOTOGRAPHY

After the indication mark of the diaphragm ring 1 is set to the EE position, the switches $ST_1$ and $ST_2$ shown in FIG. 10 are set to mark ($\tau$) and then the electric terminals a' and b' of the flash device are connected to the electrodes a and b on the shoe to complete preparation for flash photography. At this time, the sliding element $Ra_2$ of the resistance Ra is set at the position corresponding to the absolute diaphragm value corresponding to the brightness of the lens. On the other hand, as the resistances r101 to r103 have resistance components corresponding to the diaphragm value indicated by for example, F4 (ASA 100), the inputs at the plus and minus terminals of the operational amplifier circuit $OP_3$ are subtracted by the circuit. As the result, the output terminal of the amplifier $OP_3$ outputs a stepwise diaphragm control value, which indicates how many steps the maximum aperture diameter of the lens to be attached should be stopped down in order to obtain a prescribed diaphragm value (F4, for example) which gives a proper exposure. In a similar way as above, after the shutter release operation, the sector gear rotates to start the sliding of the sliding element $Ra_1$ and when the signal of the sliding element $Ra_2$ fixed in corresponding with the maximum aperture diameter of the attached lens becomes equal to a value corresponding to the output of the operational amplifier caused by the input signal from the flash device, the magnet $Mg_1$ is unexcited so that the diaphragm preset value is transferred to the preset ring 3 through the members 29 and 3c and flash photographing is made with diaphragm aperture corresponding to this preset position.

Therefore, even when a step-control interchange lens is used it is possible that the diaphragm value of the lens is automatically adjusted to the prescribed diaphragm value by the signal of absolute diaphragm value established by the flash device.

As above described, a flash device of automatic light amount adjustment type is used. The diaphragm value is automatically adjusted to a prescribed absolute diaphragm value so that any complicated operation for setting the prescribed diaphragm value is completely eliminated, and in case when the prescribed diaphragm is changed as desired, the diaphragm on the camera side is corrected so that a proper exposure can be always made without any manual correction therefore. Further, the device of the present invention can be applied to a camera which uses a step-control lens. Thus, the present invention is very useful.

FIGS. 11 and 12 show another embodiment of the present invention, and FIG. 11 shows a block diagram of the structure of the embodiment shown in FIG. 12. The embodiment shown in FIG. 11 is similar to the above mentioned embodiment in that the diaphragm aperture of the diaphragm device on the camera is adjusted to a prescribed value set on the flash device, but has features in that when the prescribed value must be adjusted beyond the maximum (or minimum) diaphragm value of the diaphragm device, the diaphragm of the camera is set to the maximum (or minimum) diaphragm value and the flash amount of the flash device is automatically adjusted to correspond to the limit diaphragm value so as to assure a proper exposure.

The circuit structure on the camera shown in FIG. 12 is similar to the embodiment shown in FIG. 11, and its detailed explanation will be omitted here.

In FIG. 11, 100 is a flash device, 200 is a control circuit for the camera having the structure shown in FIG. 9. The flash device has terminals 101a to 101d, and these terminals are connected to the terminals 201a to 201d respectively when the flash device is attached the camera by means of an accessory shoe or connecting code. Member 102 is means for selecting and setting the flash level, and by setting the means manually to a desired position, the flash level for the same object distance is changed over, and thus it is necessary to set the diaphragm aperture on the camera side in correspondence to the set position and the sensitivity of the film used. Member 103 is a generator for information set on the flash device side, which produces an electrical signal corresponding to the set position of the flash amount level selecting and setting means. Element 104 is a flash amount control circuit, 105 is a flash device composed of a flash discharge tube and a condenser so on, and 106 is a mode change-over device. When the mode change-over device is set at 106a, an electrical signal corresponding to the set position of the selecting and setting means 102 is applied to the flash amount control circuit 104 from the information generator 103. In addition, informations of the object distance are applied to the flash amount control circuit 104 whether by receiving the reflection light of the flash light from the object by means of a photoelectric conversion element or by a variable resistance adjusted in association with focussing of the photographing lens. Thus, when the flash control circuit 104 and the flash device 105 start their operation in synchronism with the shutter operation, the flash control circuit 104 produces a signal for stopping the flash to the flash device 105 when a flash amount corresponding to the object distance, film sensitivity, and diaphragm value is produced from the flash device 105. As a result a proper exposure is obtained.

When the mode change-over device is set at 106b, an electric signal corresponding to the set condition on the camera is applied to the flash amount control circuit 104, and thus a proper exposure is obtained just as in the above case. On the other hand, in when the mode change-over device is set at 106c, the flash control circuit does not operate and the flash device produces a flash intensity corresponding to the electric charges across the condensor. Thus, it is then necessary for the camera operator to set the diaphragm aperture of the objective lens to a diaphragm value corresponding to the guide number, (determined by the flash amount and the film sensitivity) and the object distance. In the camera 200, terminals 201a to 201d are connected to the terminals 101a to 101d respectively of the flash device as mentioned above, and 101d and 201d constitute a common back wire (earth). Element 202 is a synchroswitch which closes in synchronism with the operation of the shutter, thereby starting the flash device. A photometric operation circuit 203 adds inputs of the operating data (namely data for film sensitivity, shutter time and correction) to the output of the photoelectric conversion element by the TTL full-open photomeasurement (information output combining the object brightness information with the information of the full-open F value and effect of the vignetting which occures in case of a large aperture lens), and thereby produces a diaphragm step-number information which gives a proper exposure. Specifically it gives information as to how many steps the attached interchange lens should be stopped down from the full-open F value. An operation circuit 204 produces diaphragm step-number information which should give a proper exposure in correspondence to the position of the flash device etc. from a set information input from the flash device through the terminal 201b and data concerning the film sensitivity and the full-open F value. A manual diaphragm setting means 205 produces a step-number information of the preset diaphragm. The output informations in this case need not outputs by be electric signals, but they may be mechanical signals produced by displacement of the structural members. Member 206 is a diaphragm control device which actuates at the time of the release operation, and adjust the diaphragm aperture of the interchange lens corresponding to the electric or mechanical signals.

A generator 207 of preset data in the camera receives the diaphragm step-number information actually adjusted by the diaphragm control device 206. The generator 207 generates an output corresponding to the data from the flash device and transmits this output to the flash intensity control circuit 104 of the flash device 100 through the terminal 201. A mode selector switch 208 may be placed in one of three positions. When at the contact 208a, the lens diaphragm is adjusted to a proper value corresponding to the brightness of the object as determined by the output of the photo-metric operating device. This corresponds to EE operation. If the switch is placed at contact 208b, the lens diaphrgm is adjusted to the flash position. When the switch 208 is placed in position for contact 208c, the diaphragm is manually adjusted to a preset value. However, in any of these three cases, the set data generator on the camera transmits an output signal corresponding to the diaphragm value as adjusted by the diaphragm device 206 to the flash 100.

The following explanations will be made for the case, in which the flash device 100 is used in combination with the camera 200, and for the case in which the device is used in along. But even when the device is used in a combination, various types of automatic operation are possible by varying the set position of the mode selector devices 106 and 208. Thus explanations will be made according to the following classification.

(1) Photography with variable flash

When the mode selector device 106 of the flash device 100 is set at 106b and the mode selector device 208 of the camera 200 is set at 208b as shown, it is possible to photography with variable flash. In this case, an output signal corresponding to the set position of the flash level selecting and setting means 102 is transmitted from the set information generator 103 to the terminal 101b and applied to the operation circuit 204 through the terminal 201b on the camera. Thus the diaphragm of the objective lens is automatically adjusted to correspond to the output (diaphragm step-number information) of the operation circuit 204, by the diaphragm control device 206. The information of the diaphragm aperture actually adjusted by the diaphragm control device 206 is added with the film sensitivity information etc. as mentioned above by the generator 207 and is sent to the flash device 100 through the terminal 201c. This information is then applied to the flash control circuit 104 through the terminal 101c. Therefore, when the diaphragm control device 206 is actuated by the release operation and then the synchro-switch 202 is actuated in synchronism with the actuating shutter, the illumination device 105 of the flash device 100 illuminates and its flash is adjusted by the flash amount control circuit 104 to give a proper exposure. In normal cases, the output signal from the generator 207 coincides with the output from the generator 103, but they do not coincide often in the some cases, and it is one of the objects of the present invention to rectify these matters. Specifically, if the manually set position in the flash device is not appropriate and the diaphragm set thereby is beyond the adjustable range of the photographing lens, it is natural that the diaphragm aperture adjusted by the diaphragm control device 206 becomes a limit value near the above the diaphragm value, namely a full-open F value or the minimum F value. Meanwhile the signal input to the flash amount control circuit 104 is a signal corresponding to the diaphragm actually adjusted (in this case, the limit value), so that the flash device 105 produces a flash corresponding to the actually adjusted diaphragm value and thereby a proper exposure is obtained.

Also in an actual diaphragm control device 206, its input signal and the diaphragm aperture adjusted thereto do not always coincide with each other and some error is caused due to the manufacturing error and variation. In the present invention, as the information corresponding to the actual diaphragm value resulting from the control by the diaphragm control device is applied to the flash control circuit 105, such errors of the diaphragm control device 206 are completely corrected at the time of the flash photographing. As above described, when the device of the present invention is used, a flash photography with proper exposure can be assured even without paying attention to the diaphragm adjustable range of the lens on the camera side, and the error of the diaphragm device is automatically corrected.

(2) Photography with a prescribed diaphragm automatically set

When the mode selector device 106 of the flash device 100 is set at 106b and the mode selector device 208 of the camera 200 is set at 208b, it is possible to photograph with a prescribed diaphragm automatically set. In this case, the diaphragm of the camera 200 is automatically adjusted corresponding to the manually set condition of the flash device 100 and the flash amount of the flash device is controlled to give a proper exposure. However, care must be taken so as to set the flash device 100 manually within the adjustable diaphragm range of the camera lens.

(3) Automatic light-controlled photography with optional diaphragm value

When the mode selector device 106 of the flash device 100 and the mode selector device of the camera 200 are set at 208c, it is possible to effect an automatic light-controlled photography with an optional diaphragm. A flash device in which the signal output from the generator 103 to the camera side is omitted, is used in combination with a camera in which the operation circuit is omitted. Namely, the information of the diaphragm adjusted by the diaphragm manual setting means 205 on the camera side is input to the flash amount control circuit 104 of the flash device 100, and thereby a proper exposure is obtained. In this case, care should be taken so as to set the diaphragm of the photographic lens near the full-open or minimum diaphragm.

(4) Shutter preference day-light synchro photography

When the mode change-over device 106 of the flash device is set at 106b and the mode change-over device 208 of the camera 200 is set at 208a, it is possible to effect the shutter preference day-light synchro photography. Here, the camera is adjusted to a diaphragm aperture, which gives a proper exposure to the back ground corresponding to the object brightness (substantially the brightness of the back ground in case of the day-light photographing). The film sensitivity and the shutter time, and the information of the diaphragm value is applied to the flash amount control circuit 104 of the flash device 100, so that the main object is given a proper exposure by the flash illumination. Thus in case of the day-light photographing both the main object and the back ground are given a proper exposure.

(5) General light-controlled photography

When the mode selector device 106 of the flash device 100 is set at 106a, the flash device 100 operates as an ordinary computer type flash device. Thus it is possible to effect a light-controlled photographing in combination with an ordinary camera or with the camera in which the mode change-over device is set at 208b. It is natural that the diaphragm of the lens on the camera must be set manually corresponding to the set position of the flash level selecting and setting means 102 of the flash device 100.

(6) Others

By setting the mode selector device 106 at 106c, it is naturally possible to use the flash device 100 as an ordinary flash device which is not a light-controlled type, and also the camera 200 can make a flash photographs using the ordinary computer type flash device etc. by actuating the synchro-switch 202. It can make EE photographs or manual photographs without using a flash device.

One example of the present invention has been described referring to FIG. 17, but the present invention can be modified as below. When the flash device 100 is attached with the film sensitivity setting dial, and this information is applied to the set information generator 103 on the flash device to produce the diaphragm information excluding the film sensitivity information to the camera side, it is not necessary to compute the film sensitivity in the operation circuit 204 on the camera side. Thus it is possible to simplify the camera side structure. Although the mode selector device 106 on the flash device must be switched manually corresponding to various operation modes, it is easy to switch automatically. For example, if the camera 200 is used in combination with a camera without the set information generator 207, the selection can be effected easily by providing projections of various shapes on the accessory shoe portions of the both cameras, attaching a corresponding detecting member to the flash device 100 and by associating the selector switch of the mode selector device 106 therewith. Also if the associated light-controlled magic-type photography is effect, it is not necessary to transmit the diaphragm information set on the camera to the flash device. It may be possible that the set diaphragm information is transmitted only when the diaphragm exceeds the adjustable range. With an interchangeable lens of the absolute value type, it is possible to omit correction the full-open F value.

FIG. 12 shows the control circuits in the the camera and the flash device as a specific embodiment of the block diagram shown in FIG. 11. In the drawings, the control circuit 200 of the camera has almost the same structure as the control circuit shown in FIG. 10, and explanations on the common parts will be omitted. A flash terminating circuit CT is connected between the Xenon illuminating tube of the flash device and a main capacitor Co. A diode $D_1$ receives light reflected from an object upon flashing of the Xenon tube Qt. When the integrated output of the diode resulting from the sensed light and the output of an operational amplifier $OP_4$ coincide, the flash terminating circuit CT opens the flash path between the main capacitor Co and the Xenon tube to stop illumination by means of the capacitor $C_1$ forming the integration circuit and the photoelectric diode $D_1$ connected to the input of an operational amplifier $OP_5$. The resistor r101 to to r103 correspond to the similarily designated resistors in FIG. 10. The resistors RA and RB serve as bleeder resistors. The tube in e is a neon tube and resistors Rb and Ru serve as biasing resistors. Switch 303 serves as a mode selector device.

With the selector switches 303 and So as shown in the figure, when the photoe-electric voltage of the main capacitor Co is increased by a booster circuit BT and reaches a voltage enabling the illumination, the neon tube illuminates and the transistor Tr becomes conductive. Thus the diaphragm information selected by the switch So is transferred to the camera through the terminals 101b and 201b to automatically adjust the resistor Ra as in the above example. At this time, operational amplifiers $OP_4$, $OP_5$ and OT are also effectively connected. However unless the set diaphragm Ra is adjusted to be above the limit value, the timing of the stopping of the illumination of the Xenon tube by the stopping circuit CT coincides with the adjusted diaphragm value, and the flash amount is controlled corresponding to the diaphragm value. Meanwhile, when the diaphragm value reaches the limit value of the diaphragm device of the attached lens, the set value adjusted by the selector switch So on the flash device becomes improper and the diaphragm value determined thereby exceeds the adjustable range of the photographing lens. In such a case, the diaphragm device of the lens is adjusted to the maximum (or minimum) diaphragm value. On the other hand, the signal input to the operation circuit $OP_5$ is a signal corresponding to the actually adjusted diaphragm value so that the flash device gives a flash corresponding to the diaphragm value on the camera. As the output of the light receiving diode $D_1$ receives the reflection light of the object, the flash device inputs the information of the distance to the object just as the ordinary flash device and the Xenon tube is controlled in its illumination amount corresponding to the diaphragm set value on the camera side and the distance information. Meanwhile, in case the selector switch 303 is switched to 303-2, the flash photography is effected on the basis of the diaphragm value corresponding to the value determined by the selector switch So. The operating modes of the preceding items (2), (3) and (4) should be sufficiently clear not to require further explanation.

FIGS. 13 to 16 show a modification of the portion including the set information generator 207 on the camera side, the control circuit 104 on the flash device side, and the flash device 105. Specifically the circuit portion in which the flash amount of the flash device is varied according to the diaphragm value manually set on the camera. For simplification of the description, explanations of the other circuit portion will be omitted.

FIG. 13 shows the electric circuit when the flash device of the present invention F is connected to the exposure information setting circuit C on the camera side. In the figure, $D_1$ is a light receiving diode which receives the reflection light of the flash light projected on the object, C is an integration condensor, 1 is a comparator operation circuit, 2 is a switching circuit which becomes off upon receipt of the output signal from the operation circuit and in which a conventional SCR circuit is used to maintain the off state with the stop pulse. Member 3 is a DC-boosting convertor circuit which produces high voltage. Members RA, RB are respectively a bleeder resistor, Co is a capacitor, 4 is a Xenon tube, Ne is a neon tube connected to the connection point of the bleeder resistors RA and RB, $Tr_1$ is a transistor, $E_1$ is a battery, So is a mode change-over switch, and $r_1$ to $r_3$ are respectively a change-over switch for a prescribed diaphragm. The resistors r101 to r103 are correction resistors which are used selectively when a film of ASA=100 is used and the flash device is ordered to make photographing with F4 or photographing is made with a diaphragm value (for example 5.6) other than the prescribed diaphragm value.

ME is a meter which indicates an adjustable diaphragm value which gives a proper exposure as shown in FIGS. 14A and 14B and the pointer m of the meter is attached with a colored indication plate 5, which indicates a proper indication zone, so that only the diaphragm indication portion rotates around the circumference of the transparent ASA setting plate 6. One end of the indication plate 5 is partially projected and extends to the lower surface of the ASA setting plate. The ASA plate has an ASA scale (25 to 400) and a diaphragm scale F 16 to F 0.4) printed thereon and in case of a mode where the flash amount is modulated the mark A on ASA 100 comes to the fixed indication 7. Member 8 is a distance scale (1 to 2 m) fixed on the upper portion of the indication plate 5 and a photographing distance (1 to 5.6 m) which can be illuminated is indicated by the indication plate 5. Resistor $R_1$ and $R_3$ in the camera C are respectively a variable resistor for setting ASA, and a variable resistor for setting the diaphragm value, $Tr_2$ and $Tr_3$ are respectively a transistor composing the comparator circuit, $R_2$ to $R_6$ are respectively a bias resistor. The emitter output of the transistors $Tr_2$ and $Tr_3$ is connected to the accessory shoe terminals a and b and to the exposure determining circuits c and d, but the determining circuit has a change-over switch not shown therebetween, so as to add the output of the comparator circuit only at the time of a daylight photographing.

In the above structure, $R_1$ is set corresponding to the sensitivity of the film used and resistor $R_3$ is set corresponding to the diaphragm value of the photographing lens which is set preferentially. In case of the daylight photographing, two informations are inserted to the exposure determining circuits c and d and the brightness information of the object is measured by the light receiving element just as by a conventional circuit to determine a shutter speed which gives a proper exposure. Further explanation on these circuits are omitted because they have no direct relation with the present invention. Meanwhile, when a flash photography is desired, the flash device is attached to the shoe of the camera to connect electrically a—a' and b—b'.

When a operation with proper flash is to be done with the diaphragm set on the camera, the switch So is set to A and the mark A on the setting plate 6 is set to the fixed indication 7.

After the actuation of the DC converter 3 of the flash device, the potential of the capacitor Co is boosted and the neon tube does not discharge until enough charge is obtained. Thus the transistor remains off and the meter does not move and thus the indication plate indicates that the device is not ready.

When the charging of the main capacitor Co is completed, the meter swings and a settable diaphragm value and an object distance zone which can be illuminated are indicated by the indication plate 5 and the diaphragm scale and the distance scale on the setting plate 6. In this way, it is possible to confirm whether the set diaphragm value is within the zone or not. If the set diaphragm value is not within the zone in connection with the photographing distance, it is necessary to change the diaphragm value.

When the shutter is released, trigger pulses are added to the trigger pole of the Xenon tube 4 by a triggering circuit not shown in synchronism with the shutter operation and the Xenon tube starts illumination. As the result, the object is flash illuminated and its reflection light is subjected to photoelectric conversion by the light receiving element $D_1$ to charge the condensor $C_1$, and when the charge level becomes equal to the other input of the operation circuit 7, the switching circuit is turned off. With the the switching circuit off the illumination of the Xenon tube is stopped to complete one photographic cycle.

Therefore, the flash light amount of the Xenon tube is automatically adjusted in correspondence to the ASA set on the camera and the diaphragm information. Thus even when a desired diaphragm value is set preferentially on the camera, the flash device is automatically adjusted corresponding to the set diaphragm value or the ASA value. Thus thus it is possible to obtain a flash light amount which gives a proper exposure.

The resistors r101 to r103 are selection resistors which are selectively used for manual setting of the diaphragm on the camera side, but they have no direct relation with the present invention and their further explanations will be omitted.

FIG. 15 shows a specific embodiment of the electric circuit where the flash device of the present invention is applied to a single lens reflex camera using a stepwise control type interchange lens and having a memory type electronic shutter. In the figure, C—C' is a control circuit on the camera side, F is a flash device circuit. In the circuit C—C', Ra is a resistor, $Ra_1$ and $Ra_2$ are sliding elements which slide on the resistor R, and the sliding element $Ra_1$ associates with the preset diaphragm ring on the lens side to slide on the resistor. Meanwhile, the sliding element $Ra_2$ is set in its position in corresponding to the brightness of the lens attached to the camera, for example, by the length of the signal member provided on the lens side. $S_1$ to $S_4$ are respectively a mode change-over switch, and A represents a contact point for the daylight photographing, F represents a contact point for the flash photographing, and M represents a contact point for the manual photographing. RM represents a resistor for setting the shutter speed to be adjusted in the manual mode. Resistor $R_1$ is a variable resistor for setting the ASA sensitivity, $OP_1$ to $OP_5$ are an operation amplifying circuit, RF is a feedback resistor, CdS is a light receiving element for measuring the light amount of the object provided in the light path of the finder, $D_1$ is a diode element having logarithmic compression characteristics, M is a meter for indicating the shutter time. Switch $S_5$ is a memory switch, $C_1$ is a memory condensor, $RF_2$ is a feed-back resistor, $Tr_1$ is an elongation transistor, $C_2$ is a timer condensor, $S_5$ is a start switch which opens in association with the running of the front screen of the shutter, and $E_2$ and $E_3$ are respectively a standard battery for bias.

In the electric shutter of the above structure, the sliding element $Ra_1$ slides corresponding to the diaphragm value which is preferentially preset and an input signal corresponding to the set diaphragm is added to the ($-$) terminal of the operational amplifier $OP_1$. Meanwhile, as the ASA information is set by the resistor $R_1$, the operation circuit $OP_2$, whose input is connected to the output of the operation circuit $OP_1$ performs an operation together with the logabithmic diode $D_1$ connected to the feed-back path of the circuit $OP_2$ on the basis of the output of the light receiving element CdS, and the operation output is charged and memorized in the condenser $C_1$ through the memory switch.

When the shutter is released, the switch $S_5$ turns off and the charging voltage across the condenser $C_1$ is locked and the starting switch $S_6$ is opened. The voltage of the condenser $C_1$ is amplified linearly by the amplifier $OP_3$ and then expanded by the transistor $Tr_1$ and added to the operation circuit $OP_4$. As the amplifier $OP_4$ forms the Miller integration circuit together with the condensor $C_2$, it serves as a timer to actuate the magnet Mg for releasing the holding of the rear screen of the shutter after a certain constant time to close it, thus completing the shutter operation and thereby finishing the diaphragm preference daylight EE photography. On the flash device, DP is a light receiving element such as SBC which receives the reflection light of the illumination light on the object and converts it into an electric signal. As operational amplifying circuit $OP_6$ forms the Miller integration circuit together with the condensor $C_3$, $S_7$ is a start switch which opens in association with the trigger switch $S_8$ described hereinafter, $OP_7$ is a comparator circuit, one of the inputs of which is connected to the terminal $S_3$-F and the other is connected to the output of the operation circuit $OP_6$, 12 is a switching circuit corresponding to the circuit 2 in FIG. 13.

The synchro-contact point $S_8$ ($S_7$) for triggering are normally provided on the camera side because it closes in association with the front screen on the camera side, but it has been described as being provided on the flash device side for simplification.

During flash operation with the above structure, the switches $S_1$ to $S_4$ are switched to the F side to determine the diaphragm to be preset. With the setting of the diaphragm value of the photographing lens, the sliding element $Ra_1$ changes its position to correspond to the present diaphragm value. The stepwise controlled interchange lens used in this example is at the same position if the starting position of the associating with the exposure determining mechanism does not take into consideration the C correction (vignetting correction) in case a preset diaphragm ring for a lens having different brightness is set to the initial value (maximum aperture value). Therefore, the resistance between the sliding element $Ra_1$—the resistor Ra—the sliding element $Ra_2$ to be connected to the terminal F of the switch $S_1$ and the constant voltage source $E_1$ is set first to in correspond to the brightness of the lens mounted on the camera. Thus this resistance takes a value (for example, 5.6) corresponding to an absolute diaphragm value to be set for each of the lenses having a different brightness when the position of the sliding element is set by stopping down from the maximum aperture value of the lens.

FIG. 16 explains the above principle, FIGS. 16a, 16b, and 16c respectively show the operating states after the sliding element $Ra_2$ has changed its position corresponding to the brightness of each lens when lenses of $F=5.6$, 2.8, 1.4 are mounted.

Thus the operation output of the operational amplifier $OP_1$ gives a result operated from the information of the preferentially set diaphragm value and the information of the film sensitivity, and this output is added to the comparator input of the operation circuit $OP_6$.

Meanwhile, the indication of the meter ME is indicated in the finder by the pointer which swings corresponding to the constant time of 1/25 sec. set by the resistor RM.

When the front screen of the shutter starts, the start switch $S_6$ and the trigger switches $S_7$, $S_8$ are opened and closed to start the shutter operation and to cause the Xenon tube to flash. At the same time the integration condensor starts the integration of the reflection light. When the comparison inputs become equal, the operational amplifier sends a stop signal to the switching circuit to stop the illumination of the Xenon tube 14. Meanwhile, the magnet Mg for releasing the shutter rear screen is excited after the constant time set by the resistor RM to close the shutter.

Thus the flash of the flash device F is automatically adjusted to a flash amount corresponding to the set diaphragm value and the ASA information.

The above examples, have been limited to the computer type flash devices which receive reflected light. However the present invention should not be limited to the examples and may be applied to a computer type flash device in which the flash is varied on the basis of the distance to the object. Also the flash device may be integrated into the camera.

As described above, according to the present invention, the diaphragm aperture of the diaphragm device on the camera is adjusted to correspond to the prescribed value set preferentially in the flash device. The flash device varies its flash light amount according to the set value or the limit set value in case the diaphragm value on the camera side is set to the maximum or minimum limit diaphragm value to obtain a proper exposure ilumination. Thus it is possible to obtain a proper exposure illumination using any type of lens.

The terms "coupled", "coupling", and "couple" as used in the claims is used in the broad sense to include any of electrical, magnetic, mechanical, optical, and other types of coupling.

What is claimed is:

1. An automatic exposure control system with a photographic device and a flash device for use in cooperation with the photographing device at flash-photographing, comprising:
   (A) an artificial light source, which emits the illuminating light to illuminate an object and includes:
      (a) electronic illuminant means having a trigger means to initiate illumination, (b) power source means, (c) energy charge means including a capacitor means coupled to said power source means and to said illuminant means, and (d) signal forming means having an impedance means to provide a designated value of exposure aperture corresponding to the light emitted from the illuminating means and then reflected from the object;

(B) the above mentioned photographing device having:

(e) means to define the exposure aperture, (f) shutter means to define exposure time, having a synchronizing means couplable with said trigger means and linked with the shutter means, and (g) control means to automatically control said aperture defining means, having:
conversion means coupled with said aperture defining means, and control circuit means to control said conversion means and electrically coupled with the impedance means of said signal forming means when the artificial light source device is coupled with the photographing device to adjust the aperture defining means automatically to the desired aperture value, the signal forming means having a selection switch, and the impedance means having a plurality of impedance elements with different values corresponding to the sensitivity of a film used, wherein each element is connectable to said selection switch.

2. An automatic exposure control system according to claim 1, in which the artificial light source device further comprises:
illumination stopping means connected between the electronic illuminant means and the energy charge means, and
timing signal generation means connected with the stopping means and the synchronizing means, and at the same time impresses timing signal to the stopping means to stop illumination after the synchronizing means is initiated and after an elapse of a time corresponding to the distance to an object.

3. An automatic exposure control system according to claim 2, wherein the signal forming means has a second selection switch, and the impedance means has a plural number of second impedance elements with different values corresponding to the sensitivity of film used, and wherein each element is connected to said switch and also electrically connected to the timing signal generating means through said switch.

4. An automatic exposure control system with a photographic device and a flash device for use in cooperation with the photographing device at flash-photographing, comprising:

(A) an artificial light source, which emits the illuminating light to illuminate an object and includes:

(a) electronic illuminant means having a trigger means to initiate illumination, (b) power source means, (c) energy charge means including a capacitor means coupled to said power source means and to said illuminant means, and (d) signal forming means having an impedance means to provide a designated value of exposure aperture corresponding to the light emitted from the illuminating means and then reflected from the object;

(B) the above mentioned photographing device having:

(e) means to define the exposure aperture, (f) shutter means to define exposure time, having a synchronizing means coupleable with said trigger means and linked with the shutter means, and (g) control means to automatically control said aperture defining means, having:
conversion means coupled with said aperture defining means, and
control circuit means to control said conversion means and electrically coupled with the impedance means of said signal forming means when the artificial light source device is coupled with the photographing device to adjust the aperture defining means automatically to the designated aperture value, the artificial light source device further comprising:
a voltage detection means connected to the capacitor means and having switching means which becomes conductive as said capacitor means reaches a potential which permits illumination, wherein said switching means is electrically connected to the signal forming means.

5. A photographic system comprising:

I. an artificial illumination device having:

(A) electronic flash means for producing a flash, (B) electric energy charge means, (C) means coupled to the flash means and the charge means to discharge the charge of the charge means through the flash device for obtaining auxiliary illumination light, (D) illuminance variable means connected to the discharge means to adjust its amount of discharge, and (E) signal forming means for forming a signal as corresponding to the designated value of exposure aperture depending on the luminance of the flash means, and II. a camera including:

(F) aperture defining means to define an exposure aperture and adjust the exposure aperture from the maximum aperture to the minimum aperture, (G) shutter means to define an exposure time, and (H) control means to automatically control and adjust the defining means, and having:

(H-1) conversion means functionally coupled to said aperture defining means, (H-2) control circuit means coupled to said conversion means to control said conversion means, and (H-3) impedance means to form an electric signal corresponding to the defined value of said aperture defining means, (H-4) said defining means being coupled to said signal forming means and said luminance variable means when the artificial light source device is coupled with the photographing device so that the defining means is automatically controlled by said signal forming means and at the same time luminance is adjusted corresponding to the aperture thereof;

III. the signal forming means further having a selection switch, and the impedance means having a plural number of impedance elements with different values corresponding to the sensitivity of film used, wherein each element is connectable to said selection switch.

6. A photographic system comprising:
an artificial illumination device having:
- (a) electronic flash means to produce a flash,
- (b) electric energy charge means,
- (c) means coupled to the flash means and the charge means to discharge the charge of the charge means through the flash device for obtaining auxiliary illumination light,
- (d) illuminance variable means connected to the discharge means to adjust its amount of discharge, and
- (e) signal forming means for forming a signal as corresponding to the designated value of exposure aperture depending on the luminance of the flash means, and a photographing device having:
- (f) defining means to define the exposure aperture and adjust the exposure aperture from the maximum aperture to the minimum aperture,
- (g) shutter means to define an exposure time, and
- (h) control means to automatically control and adjust the defining means, having:
  - conversion means functionally coupled to said aperture defining means,
  - control circuit means coupled to said conversion means to control said conversion means, and
  - impedance means to form an electric signal corresponding to the defined value of said aperture defining means,
  - said defining means being coupled to said signal forming means and said luminance variable means when the artificial light source device is coupled with the photographing device so that the defining means is automatically controlled by said signal forming means and at the same time luminance is adjusted corresponding to the aperture thereof
the artificial illumination device further comprises:
  - capacitor means in said charge means, voltage detection means, which is connected to the above mentioned capacitor means, and has switching means which becomes conductive as said capacitor means reaches a potential which permits illumination, wherein said switching means is electrically connected to the signal forming means.

7. A system with an automatic exposure control for flash photographing, comprising:
(A) an artificial light source device, which emits illumanting light to illuminate an object and contains:
- a. electronics illuminant means having trigger means to initiate illumination,
- b. power source means,
- energy charge means which has capacitor means coupled to said illuminant means and said power source,
- d. signal forming means for providing a designated value of exposure aperture corresponding to the amount of luminance by the above-mentioned illuminant means, and
(B) the photographing device having:
- e. means to define the above mentioned exposure aperture,
- f. shutter means to define exposure time, and
- g. control means to automatically control said aperture defining means, said control means having:
  - conversion means functionally coupled with said aperture defining means, and
  - control circuit means to control said conversion means, being electrically coupled with the signal forming means when the artificial light source device is coupled with the photographing device to adjust the defining means automatically to the designated aperture value, said control circuit means including
  - variable resistance means variable corresponding to the value defined by the aperture defining means, and
  - a comparison circuit which is connected to said signal forming means and said variable resistance means for comparing both and for controlling said conversion means.

8. An automatic exposure control system for flash-photographing comprising:
A. an artificial light source for emitting light to illuminate an object, said source including
- (a) illuminant means having a trigger to initiate illumination,
- (b) a power source,
- (c) capacitor means coupled to the illuminant means,
- (d) illumination stopping means, which is coupled with the illuminant means to make the illuminating quality variable,
- (e) signal forming means, for providing a first signal having a designated absolute value of an exposure aperture,
B. a photographing device which comprises:
- (a) diaphragm means for defining a given exposure aperture between maximum and minimum limit values,
- (b) shutter means for defining exposure time,
- (c) control means connectable to the diaphragm means for automatically determining the aperture of the diaphragm,
- (d) conversion means coupled with the diaphragm means for producing a second signal corresponding to the determined aperture value,
- (e) first means for connecting the conversion means and the signal forming means to the stopping means, and
- (f) second means for connecting the control means to the signal forming means,
- (g) whereby means for sensing when aperture limit values are reached and for producing a first illumination when the determined aperture value is between the limit values and a different degree of illumination suitable for a limit value.

9. A system comprising:
A. A photographic camera including:
- (a) aperture defining means for defining expsoure apertures,
- (b) shutter means for defining exposure time,
- (c) synchronizing means coupled to said shutter means for closing in synchronism with the opening of the shutter means,
- (d) control means for automatically controlling closing of said aperture defining means from its initial maximum aperture value to a desired aperture value, (e) converter means connected to the control means, said converter means including an input for converting a signal corresponding to the desired diaphragm value applied to the input into an output corresponding to the departure from the initial maximum aperture value to the desired aperture value, and B. an illuminating device, which emits illuminating light to illuminate an object, said illuminating device including (f) signal forming means which provides the signal of the converter means corresponding to the desired diaphragm aperture value based on the amount of illuminating light, C. the camera further comprising:

(g) variable resistance means coupled to said aperture defining means for being set to values defined by the aperture defining means, and the converter means includes a comparison circuit which is connected to the signal forming means and the variable resistance means for comparing both and forming the output thereof.

10. An exposure control system according to claim 9, the illuminating device further comprises:
power source circuit means,
illuminating means coupled to said source means and having trigger means operatively connected to the synchronizing means,
light control means connected to the illuminating means for stopping the illumination of the illuminating means, the control means being connected to the light control means for adjusting the illuminating light quantity corresponding to the desired aperture value.

11. An exposure control system according to claim 9, wherein the camera further comprises photosensitive circuit means having a photoelectric transducer, and the camera is uable with interchangeable objective lenses having different maximum aperture values, the transducer being positioned behind the position of the lens.

12. An exposure control system according to claim 11, wherein the defining means has a coupling member for coupling the camera to different interchangeable objective lenses, the initial position of said member being the same for each interchangeable objective lens.

13. A system comprising:
A. a photographic camera including:
(a) aperture defining means for defining exposure apertures,
(b) shutter means for defining exposure time,
(c) synchronizing means coupled to said shutter means for closing in synchronism with the opening of the shutter means,
(d) control means for automatically controlling the closing of said aperture defining means from its initial maximum aperture value to a desired aperture value,
(e) converter means connected to the control means, said converter means including an input for converting a signal corresponding to the desired diaphragm value applied to the input into an output corresponding to the departure from the initial maximum aperture value to the desired aperture value,
(f) photo-sensitive circuit means which receive luminous flux from an object to form an electrical signal corresponding to the departure from the maximum aperture to the desired aperture for proper exposure, and (g) means for selectively connecting one of the circuit means and the converter means to the control means, B. an illuminating device, which emits illuminating light to illuminate an object, said illuminating device including (h) signal forming means wich provides the signal of the converter means corresponding to the deisred diaphragm aperture value based on the amount of illuminating light, (i) power source circuit means, (j) energy charge means which has capacitor means connected to the power source circuit means, and (k) illuminating means coupled to said charge means and having trigger means to initiate illumination, the charge means having charging-stating detecting means connected to the signal forming means.

14. An automatic exposure control system for flash photography comprising:

(A) means for defining an exposure factor including an aperture, (B) control means connected operatively to the defining means for determining the factor value thereof automatically, (C) electrical memorizing means connected with the control means for memorizing an output corresponding to the exposure factor, (D) an artificial illuminating means comprising
(a) power source circuit means,
(b) energy charge means which has capacitor means connected to the power source circuit means,
(c) illuminating means having trigger means to initiate illumination, and
(d) signal forming means connectable to the control means through the memorizing means for furnishing at least the output of the memorizing means, (E) shutter means to define an exposure time, (F) the defining means being adjustable to a given aperture based on the output of the memorizing means.

15. An automatic exposure control system according to claim 14, wherein
the memorizing means being capacitor means for memorizing the output electrically therein.

16. An automatic exposure control system according to claim 14, wherein
the signal forming means is connected to the energy charge means through switching means, thereby the output of the forming means is produced only when the switching means becomes conductive.

17. An automatic control system according to claim 16, further comprising:
photosensitive circuit means which receive luminous flux from an object to form an electrical signal and is at the same time functionally coupled with the memorizing means,
means for making the signal forming means ineffective, which comprises second switching means electrically connected to the signal forming means.

18. An automatic exposure control system according to claim 17, wherein the second switching means includes a mechanically operable switch connected between the forming means and the memorizing means which is actuated by an operator.

19. An automatic exposure control system according to claim 17, wherein
the first switching means includes neon tube circuit means connected between the forming means and the energy charge means.

20. An automatic exposure control system defined in claim 14, wherein said signal forming means comprises voltage detecting circuit means operatively connected to the charge means for furnishing an electric signal to be memorized in said memorizing means when the energy charge means is charged over a given value.

21. For use with a flash device having signal means for producing a signal to designate a suitable exposure aperture, a camera comprising:
(A) a camera body,
(B) shutter means in the body for determining an exposure time on the basis of the opening and closing thereof,
(C) synchronizing means coupled to the shutter means for producing a flash starting signal in synchronism with the opening of the shutter means,
(D) diaphragm means for forming an aperture and establishing the amount of light passing therethrough,
(E) diaphragm control means coupled to the diaphragm means which is provided with a control circuit for controlling the aperture, said control circuit having input and output terminals to produce an electric output in response to an electric signal impressed upon the input terminal for adjustment of said diaphragm means, said diaphragm control means also including defining means connected to the output terminal of the control circuit and coupled to the diaphragm means,
(F) electric terminal means on the camera body for selective connection to the signal means of the flash device,
(G) the electric terminal means being electrically connected to the input terminal of the control circuit of the diaphragm control means to cause the diaphragm control means to adjust the diaphragm to the exposure aperture value designated by said flash device,
said control circuit including
(H) variable resistance means having a resistance value corresponding to the aperture value of said diaphragm means,
(I) a comparison circuit having two input terminals one electrically connected to said electric terminal and an output terminal connected to the output terminal of said diaphragm control circuit; and
said defining means including
(J) electromagnetic means connected to the output of said diaphragm control circuit and operatively linked with said diaphragm means for setting the diaphragm aperture.

22. For use with a flash device which illuminates a photographic object and which is provided with signal means for producing, concurrently with the illumination, a signal to designate a value of exposure aperture for flash operation, a camera comprising:
(A) a camera body having a shoe for securing the flash device thereto,
(B) shutter means inside the camera body for determining exposure time on the basis of the opening and closing operation thereof,
(C) synchronizing means to be coupled to the shutter time for producing a flash starting signal in synchronism with the opening of the shutter means,
(D) diaphragm means for controlling the amount of exposure light through the aperture thereof, and
(E) diaphragm control means comprising:
(a) information input means which is couplable with the signal means of the flash device when the flash device is fitted to the camera body for producing an electrical signal corresponding to the signal of the signal means,
(b) a control circuit having input terminals selectively connectable to the information input means and output terminals for producing a signal that defines the aperture means,
(c) a photometric circuit having a photosensitive element for receiving the light from the photographic object and is selectively connected to the input terminal of the control circuit,
(d) photographic mode selecting means connected to the input terminal of the control circuit for connecting one of the information input means and the photometric circuit to the input terminal of the control circuit,
the diaphragm means being settable to a value to ensure suitable exposure when the flash device is secured to the camera body,
said information input means includes a variable resistance secured to the camera body and has a variable resistance value adjustable in responce to the length of a fixed member which projects from the flash device as the signal means and whose length corresponds to a designated exposure aperture.

23. A flash device according to claim 22, further comprising
indicating means connected with said exposure aperture signal forming means, and able to indicate a distance range of the proper exposure.

24. A flash device according to claim 23, wherein said indicating means is a galvanometer having an exposure aperture indicating seal.

25. A photographic system comprising:
a camera,
a flash device electrically couplable to the camera,
aperture defining means in the camera for defining an exposure aperture,
shutter means in the camera for defining an exposure time,
synchronizing means in the camera coupled to said shutter means for closing in synchronism with said shutter means,
control means in said camera for controlling said aperture defining means,
photosensitive circuit means in said control means responsive to luminous flux from an object to form an electrical signal for adjusting the aperture to be defined by said defining means on the basis of said electrical signal,
control circuit means in one of said camera and said flash device and electrically couplable with said aperture defining means for controlling said aperture defining means,
mode transfer means in said camera and electrically coupled to said photosensitive circuit means and electrically couplable to said control circuit means for alternately coupling one of said circuit means to said aperture control means and decoupling the other means so as to transfer between a natural light photographic mode and a flash mode, flash trigger means on said flash device electrically connectable with said synchronizing means, and signal forming means coupled with said control circuit means when said flash device is mounted on the camera and said trigger means and said synchronizing means are connected for transmitting an aperture value required by the flash device and constraining the control circuit means to set said aperture defining means to the aperture value required by the flash device.

26. A system according to claim 25, in which said mode transfer means includes changeover means operatively connectable with one portion of said flash device for automatically coupling said signal forming means with said aperture control means.

27. A system according to claim 25, in which said aperture defining means has aperture value indicating means for enabling the aperture manually set to a desired value for proper flash photography.

28. A system as in claim 25, wherein said control means automatically controls said aperture defining means.

29. A system according to claim 25, in which the signal forming means is a resistance means having a selectable resistance value.

30. A system according to claim 29 wherein said camera includes a flash mount, and the resistance means has a terminal at the flash mount.

31. A system according to claim 25, in which the signal forming means is a signal member fixedly provided at the flash device, wherein the flash control circuit means includes a variable resistance means having a sliding member shiftable by said fixed signal member, and the amount that the sliding member is shifted by the signal member corresponds to the luminance of the flash device.

32. A system according to claim 25, in which the flash device further includes:

electric flash means electrically connected to the flash trigger means, energy charge means electrically connected to the above mentioned flash means, detection means which is coupled with the charge means to detect its charge potential level, and a switching circuit which is electrically connected to said detection means and has a constant conductivity threshold value, wherein the above mentioned signal forming means is connected to said detection means.

33. A system according to claim 32, in which the switching circuit includes:

a neon tube, and a transistor having a base connected to said neon tube and an output electrode connected to the signal forming means.

34. A system according to claim 25, in which the aperture defining means and the shutter means are made of a single diaphragm blade shutter means and the control means further includes a second trigger means, which causes the shutter means to close after an elapse of time corresponding to the electric signal of the photo-sensitive circuit means.

35. A system according to claim 25, in which the control means further includes:

second trigger means which is selectively coupled with the photo-sensitive circuit means and said flash control circuit means and forms a control stop signal after an elapse of time corresponding to the electric signal from one of said two circuit means, and electro-magnetic means electrically coupled with said trigger means, and coupled with the aperture defining means for adjusting the aperture of said aperture defining means.

36. A system according to claim 35, in which the control means further includes:

a variable resistance means which is varied depending on the aperture of the aperture defining means, and comparison circuit means having an output connected to the control circuit means, a first comparative input being connected with the variable resistance means, and a second comparative input connected with the signal forming means.

37. A system according to claim 36, wherein the signal forming means includes selectively variable resistance means for producing a resistance selectable at a plurality of different values each corresponding to the flash luminance of the flash device on the basis of the sensitivity of a film used.

* * * * *